(12) United States Patent
Montero et al.

(10) Patent No.: US 12,353,274 B2
(45) Date of Patent: Jul. 8, 2025

(54) OUT-OF-BAND (OOB) DIAGNOSTICS IN HETEROGENEOUS COMPUTING PLATFORMS

(71) Applicant: Dell Products, L.P., Round Rock, TX (US)

(72) Inventors: Adolfo S. Montero, Pflugerville, TX (US); Abeye Teshome, Austin, TX (US); Alok Pant, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 18/364,068

(22) Filed: Aug. 2, 2023

(65) Prior Publication Data

US 2025/0045143 A1 Feb. 6, 2025

(51) Int. Cl.
| | |
|---|---|
| *G06F 11/07* | (2006.01) |
| *G06F 13/40* | (2006.01) |
| *G06F 15/78* | (2006.01) |
| *H04L 9/40* | (2022.01) |

(52) U.S. Cl.
CPC ........ *G06F 11/0784* (2013.01); *G06F 11/079* (2013.01); *G06F 13/40* (2013.01); *G06F 15/7807* (2013.01); *G06F 15/7867* (2013.01); *H04L 63/18* (2013.01)

(58) Field of Classification Search
CPC .... G06F 11/0784; G06F 11/079; G06F 13/40; G06F 15/7807; G06F 15/7867; H04L 63/18
USPC .......................................................... 714/57
See application file for complete search history.

(56) References Cited

U.S. PATENT DOCUMENTS 6,351,819 B1 * 2/2002 Berglund .................. G06F 1/26
713/310
2022/0217803 A1 * 7/2022 Chakraborty ......... H04W 76/19

* cited by examiner

*Primary Examiner* — Yair Leibovich
(74) *Attorney, Agent, or Firm* — Fogarty LLP

(57) ABSTRACT

Systems and methods for Out-of-Band (OOB) diagnostics in heterogeneous computing platforms. In some embodiments, an Information Handling System (IHS) may include a heterogeneous computing platform having a plurality of devices and an Out-of-Band (OOB) Microcontroller Unit (MCU) integrated into the heterogeneous computing platform and coupled to the plurality of devices via an interconnect. The OOB MCU may be configured to: receive a result of a diagnostics operation performed with respect to at least a given one of the plurality of devices, and transmit an indication of the result, as part of an OOB sniffing operation, to a remote IHS.

16 Claims, 25 Drawing Sheets

OUT-OF-BAND (OOB) DIAGNOSTICS IN HETEROGENEOUS COMPUTING PLATFORMS

FIELD

This disclosure relates generally to Information Handling Systems (IHSs), and more specifically, to systems and methods for Out-of-Band (OOB) diagnostics in heterogeneous computing platforms.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Historically, IHSs with desktop and laptop form factors have had conventional Operating Systems (OSs) (e.g., WINDOWS, LINUX, MAC OS, etc.) executed on INTEL or AMD's "x86"-type processors. Other types of processors, such as ARM processors, have been used in smartphones and tablet devices, which typically run thinner, simpler, or mobile OSs (e.g., ANDROID, IOS, WINDOWS MOBILE, etc.).

More recently, however, IHS manufacturers have started producing full-fledged desktop and laptop IHSs equipped with ARM-based platforms. In fact, certain OSs (e.g., WINDOWS on ARM) have also been developed to provide users with a more quintessential OS experience on those platforms.

Devices known as Embedded Controllers (ECs) have played a central role in their overall operation of traditional x86-based platforms. An EC is a microcontroller or processing core mounted on an IHS's motherboard which is configured to manage several critical IHS processes, ranging from early power rail sequencing to power limits and thermal limits, and to provide low-level hardware controls via a myriad of General-Purpose Input/Outputs (GPIOs).

The EC is also responsible for facilitating Out-of-Band (OOB) management of its IHS. OOB management involves the use of dedicated interfaces for accessing and managing aspects of an IHS from a remote location, through a plane separate from the production network. As the inventors hereof have recognized, however, ARM-based platforms currently lack ECs (or other microcontrollers) usable to support OOB management.

SUMMARY

Systems and methods for Out-of-Band (OOB) diagnostics in heterogeneous computing platforms are described. In an illustrative, non-limiting embodiment, an Information Handling System (IHS) may include a heterogeneous computing platform having a plurality of devices and an Out-of-Band (OOB) Microcontroller Unit (MCU) integrated into the heterogeneous computing platform and coupled to the plurality of devices via an interconnect. The OOB MCU may be configured to: receive a result of a diagnostics operation performed with respect to at least a given one of the plurality of devices, and transmit an indication of the result, as part of an OOB sniffing operation, to a remote IHS.

For example, the heterogeneous computing platform may include: a System-On-Chip (SoC), a Field-Programmable Gate Array (FPGA), or an Application-Specific Integrated Circuit (ASIC). The heterogeneous computing platform may include a Reduced Instruction Set Computer (RISC) processor and a plurality of devices coupled to an interconnect. The plurality of devices may include at least one of: a Graphical Processing Unit (GPU), an audio Digital Signal Processor (aDSP), a sensor hub, a Neural Processing Unit (NPU), a Tensor Processing Unit (TPU), a Neural Network Processor (NNP), an Intelligence Processing Unit (IPU), an Image Signal Processor (ISP), or a Video Processing Unit (VPU). And the interconnect may include at least one of: an Advanced Microcontroller Bus Architecture (AMBA) bus, a QuickPath Interconnect (QPI) bus, or a HyperTransport (HT) bus.

For example, the result may include a hardware failure associated with the given device. The OOB MCU may be further configured to perform the diagnostics operation upon the given device. Additionally, or alternatively, the OOB MCU may be further configured to, prior to receipt of the result, send a message or signal to the given device to request that the diagnostics operation be performed.

To transmit the indication of the result as part of the OOB sniffing operation, the OOB MCU may be configured to determine, based at least in part upon an OOB diagnostics policy, that the result is subject to delayed reporting.

Additionally, or alternatively, to transmit the indication of the result as part of the OOB sniffing operation, the OOB MCU may be configured to: wake up while a host processor of the heterogeneous computing platform is in a low-power state; and wake up a network device configured to access the remote IHS while the host processor remains in the low-power state. The low-power state may include an Advanced Configuration and Power Interface (ACPI) G3 state.

In another illustrative, non-limiting embodiment, an Embedded Controller (EC) may be coupled to a heterogeneous computing platform of an IHS, the EC including a processing core and a memory coupled to the processing core, the memory having program instructions stored thereon that, upon execution by the processing core, cause the EC to: receive a result of a diagnostics operation performed with respect to a device coupled to the EC; and transmit an indication of the result, as part of an OOB sniffing operation, to a remote IHS.

The device may be selected from the group consisting of: a charger, a battery, a power circuit, a fan, a keyboard, a thermal sensor, and a connector. Moreover, the result may include a hardware failure.

To transmit the indication of the result as part of the OOB sniffing operation, the program instructions, upon execution by the processing core, may cause the EC to determine, based at least in part upon an OOB diagnostics policy, that the result is subject to delayed reporting. Additionally, or alternatively, to transmit the indication of the event as part of the OOB sniffing operation, the EC may be configured to: wake up while a host processor of the heterogeneous computing platform is in a low-power state and wake up a network device configured to access the remote IHS while the host processor remains in the low-power state.

In yet another illustrative, non-limiting embodiment, a method may include receiving, from an IHS as part of an OOB sniffing operation, an indication of a diagnostics operation collected by an OOB MCU integrated into a heterogeneous computing platform or an EC coupled to the heterogeneous computing platform, and determining whether to: (a) display the indication to an Information Technology Decision Maker (ITDM), or (b) log the indication.

The method may include receiving the indication as part of an OOB sniffing operation. The method may also include, prior to receiving the indication, sending a request to the OOB MCU or EC to: (i) perform the diagnostics operation with respect to a selected device coupled to the OOB MCU or EC, or (ii) request that the selected device perform the diagnostics operation. In some cases, the indication may be contained in an opaque OOB packet transmitted by the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
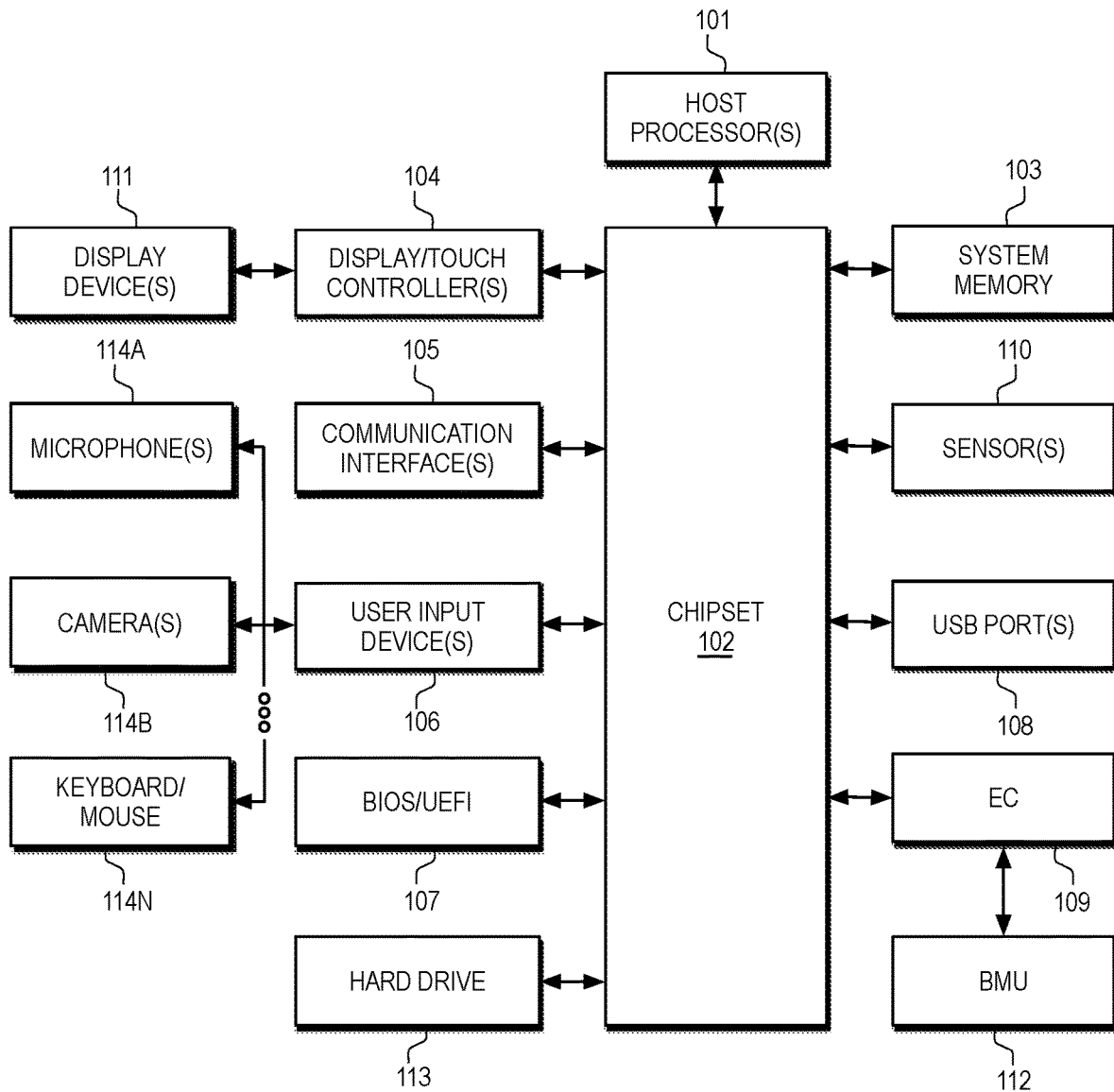
FIG. 1 is a diagram illustrating examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc.

The term "firmware," as used herein, refers to a class of program instructions that provides low-level control for a device's hardware. Generally, firmware enables basic functions of a device and/or provides hardware abstraction services to higher-level software, such as an Operating System (OS). The term "firmware installation package," as used herein, refers to program instructions that, upon execution, deploy device drivers or services in an IHS or IHS component.

The term "device driver" or "driver," as used herein, refers to program instructions that operate or control a particular type of device. A driver provides a software interface to hardware devices, enabling an OS and other applications to access hardware functions without needing to know precise details about the hardware being used. When an application invokes a routine in a driver, the driver issues commands to a corresponding device. Once the device sends data back to the driver, the driver may invoke certain routines in the application. Generally, device drivers are hardware dependent and OS-specific.

The term "telemetry data," as used herein, refers to information resulting from in situ collection of measurements or other data by devices within a heterogenous computing platform, or any other IHS device or component, and its transmission (e.g., automatically) to a receiving entity, for example, for monitoring purposes. Typically, telemetry data may include, but is not limited to, measurements, metrics, and/or values which may be indicative of: core utilization, memory utilization, network quality and utilization, battery utilization, peripheral or I/O device utilization, etc.

For instance, telemetry data may include, but is not limited to, measurements, metrics, logs, or other information related to: current or average utilization of IHS components, CPU/core loads, instant or average power consumption of IHS components, instant or average memory usage by IHS components, characteristics of a network or radio system (e.g., WiFi vs. 5G, bandwidth, latency, etc.), keyboard or mouse usage data, transaction times, latencies, response codes, errors, data produced by other sensors, etc.

To its user, an IHS may appear to be either "on" or "off," without any other detectable power states. In many implementations, however, an IHS may support multiple power states that correspond to the states defined in the Advanced Configuration and Power Interface (ACPI) specification, such as: S0, S1, S2, S3, S4, S5, and G3.

For example, when an IHS is operating in S0 mode ("working"), the IHS is fully usable, yet hardware components not in use can still save power by entering a lower power state. In the S0 low-power idle mode ("Sleep" or "Modern Standby") an IHS remains partially running so that it can stay up to date whenever a suitable network is available, wake into S0 mode when real-time action is required (e.g., OS maintenance, etc.), and so on. In this state, an IHS can quickly switch from to a higher-power state in response to hardware and network events.

In the past, S3 used to be the default "Sleep state;" however, now most IHSs have transitioned to "modern standby," which designates "S0ix" as a hybrid mode of S0, such that all devices are put into their lowest power state but x86 can still execute code such as networking for "connected standby."

When an IHS does not support modern standby, it can instead assume any of states S1-S3 (also referred to as "Sleep" modes), where to a user the IHS may appear to be off. Some IHSs support only one or two of these Sleep states. Particularly, the amount of power consumed in states S1-S3 is less than S0 and more than S4. S3 consumes less power than S2, and S2 consumes less power than S1. In states S1-S3, volatile memory is kept refreshed to maintain the IHSs state, and some components remain powered so the IHS can wake from input from the keyboard, Local Area Network (LAN), or a Universal Serial Bus (USB) device. "Hybrid sleep," used only on certain types of IHSs, takes place when the IHS uses a hibernation file with S1-S3. The hibernation file saves the IHS's state in case it loses power while in sleep.

In the S4 state ("Hibernate"), power consumption is reduced to its lowest level. The IHS saves the contents of volatile memory to a hibernation file and some components remain powered so the computer can wake from input from the keyboard, LAN, or a USB device. The working context can be restored if stored on nonvolatile media. "Fast startup" is where the user is logged off before the hibernation file is created, which allows for a smaller hibernation file in IHSs with reduced storage capabilities.

When in the S5 state ("Soft off" or "Full Shutdown"), an IHS is fully shut down without a hibernation file. It occurs when a restart is requested or when an application calls a shutdown Application Programming Interface (API) command. During a full shutdown and boot, the entire user session is torn down and restarted on the next boot, and a boot/startup from S5 takes significantly longer than S1-S4. At the hardware level, the only difference between S4 and S5 is that S4 keeps a flag on the storage device telling the OS bootloader to boot from the hibernation file instead of booting from scratch.

In G3 ("Mechanical off"), the IHS is completely turned off and consumes absolutely no power from its Power Supply Unit (PSU) or main battery (e.g., a lithium-ion battery), with the exception of any Real-Time Clock (RTC) batter(ies) (e.g., Complementary Metal Oxide Semiconductor or "CMOS" batteries, Basic Input/Output System or "BIOS" batteries, coin cell batteries, etc.), which are used to provide power for the IHS's internal clock/calendar and for maintaining certain configuration settings. In some cases, G3 represents the lowest possible power configuration of an IHS from which the IHS can be initialized; all voltage rails are turned off except for RTC rails.

From G3 an IHS typically goes to S5 based on AC insertion (for transition between battery mode to AC mode). Additionally, or alternatively, an IHS may transition from G3 to S0 based upon the detection of a power button event.

As used herein, the term "Out-of-Band (OOB) management" refers to the use of dedicated interfaces for accessing and managing aspects (e.g., firmware updates, change BIOS settings, collect device inventory, collect telemetry data, etc.) of an IHS from a remote location, through a plane separate from the production network. For example, a form of out-of-band management is referred to as Lights-Out Management (LOM), which employs a dedicated management channel for device maintenance and allows a system administrator to monitor and manage an IHS by remote control, regardless of whether the IHS is powered on or whether an OS is installed or functional.

It should be noted that the term "OOB management" is used in contradistinction with "in-band management," the latter being based upon in-band connectivity (the usual or "production" network channel) and requiring that software be installed on the IHS being managed, which works only after the OS has been successfully booted and networking is brought up.

FIG. 1 is a block diagram of components of IHS 100. As depicted, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as Ethernet, WiFi, BT, cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, microphones, headsets, etc.). Moreover, communication interface (s) 105 may be coupled to chipset 102 via a Peripheral Component Interconnect Express (PCIe) bus, or the like.

Chipset 102 may be coupled to display and/or touchscreen controller(s) 104, which may include one or more or Graphics Processor Units (GPUs) on a graphics bus, such as an Accelerated Graphics Port (AGP) or PCIe bus. As shown, display controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more USB ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensors 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), and/or acceleration sensor(s).

BIOS 107 is coupled to chipset 102. UEFI was designed as a successor to BIOS, and many modern IHSs utilize UEFI in addition to or instead of a BIOS. Accordingly, BIOS/UEFI 107 is intended to also encompass a UEFI component BIOS/UEFI 107 provides an abstraction layer that allows the OS to interface with certain hardware components that are utilized by IHS 100.

Upon booting of IHS 100, host processor(s) 101 may utilize program instructions of BIOS 107 to initialize and test hardware components coupled to IHS 100, and to load host OS 300 for use by IHS 100. Via the hardware abstraction layer provided by BIOS/UEFI 107, software stored in system memory 103 and executed by host processor(s) 101 can interface with certain I/O devices that are coupled to IHS 100.

Embedded Controller (EC) 109 (sometimes referred to as a Baseboard Management Controller or "BMC") includes a microcontroller unit or processing core dedicated to handling selected IHS operations not ordinarily handled by host processor(s) 101. Examples of such operations may include, but are not limited to: power sequencing, power management, receiving and processing signals from a keyboard or touchpad, as well as other buttons and switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing the battery charger and the battery, enabling remote management, diagnostics, and remediation over network(s) 103, etc.

Unlike other devices in IHS 100, EC 109 may be made operational from the very start of each power reset, before other devices are fully running or powered on. As such, EC 109 may be responsible for interfacing with a power adapter to manage the power consumption of IHS 100. These operations may be utilized to determine the power status of IHS 100, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

In some cases, EC 109 may implement operations for detecting certain changes to the physical configuration or posture of IHS 100 and managing other devices in different configurations of IHS 100. For instance, when IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In this manner, EC 109 may identify any number of IHS postures, including, but not limited to: laptop, stand, tablet, or book. For example, when display(s) 111 of IHS 100 is open with respect to a horizontal keyboard portion, and the keyboard is facing up, EC 109 may determine IHS 100 to be in a laptop posture. When display(s) 111 of IHS 100 is open with respect to the horizontal keyboard portion, but the keyboard is facing down (e.g., its keys are against the top surface of a table), EC 109 may determine IHS 100 to be in a stand posture. When the back of display(s) 111 is closed against the back of the keyboard portion, EC 109 may determine IHS 100 to be in a tablet posture. When IHS 100 has two display(s) 111 open side-by-side, EC 109 may determine IHS 100 to be in a book posture. In some implementations, EC 109 may also determine if display(s) 111 of IHS 100 are in a landscape or portrait orientation.

In some implementations, EC 109 may be installed as a Trusted Execution Environment (TEE) component to the motherboard of IHS 100. Additionally, or alternatively, EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. As such, EC 109 may validate the integrity of hardware and software components installed in IHS 100.

In addition, EC 109 may provide an OOB channel that allows an Information Technology Decision Maker (ITDM) or Original Equipment Manufacturer (OEM) to manage IHS 100's various settings and configurations, for example, by issuing OOB commands.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries).

Figure 2:
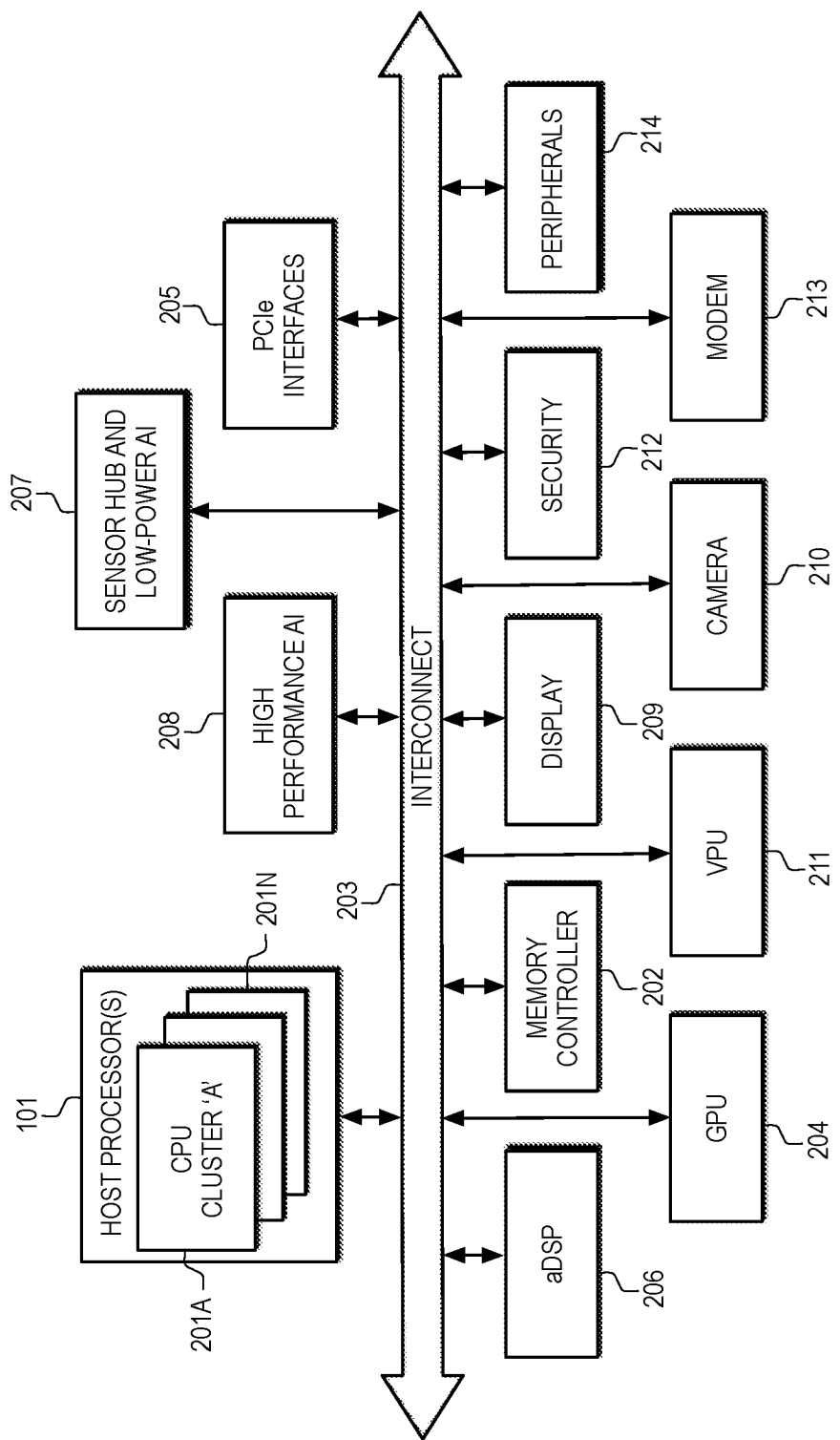
FIG. 2 is a diagram illustrating an example of a heterogenous computing platform, according to some embodiments.

Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to other IHS components, such as, for example devices within heterogeneous computing platform 200 (FIG. 2).

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), events, etc.

Examples of events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components shown in FIG. 1 (e.g., chipset 102, display controller(s) 104, communication interface(s) 105, EC 109, etc.) may be replaced by devices within heterogenous computing platform 200 (FIG. 2). As such, IHS 100 may assume different form factors including, but not limited to: servers, workstations, desktops, laptops, appliances, video game consoles, tablets, smartphones, etc.

FIG. 2 is a diagram illustrating an example of heterogenous computing platform 200. In various embodiments, heterogenous computing platform 200 may be implemented in an SoC, FPGA, ASIC, or the like. Heterogenous computing platform 200 includes a plurality of discrete or segregated devices, each device having a different set of processing capabilities suitable for handling a particular type of computational task. When each device in platform 200 executes only the types of computational tasks it is specifically designed to execute, the overall power consumption of heterogenous computing platform 200 is reduced.

In various implementations, each device in heterogenous computing platform 200 may include its own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in heterogenous computing platform 200 may be accessible through a respective Application Programming Interface (API). Additionally, or alternatively, each device in heterogenous computing platform 200 may execute its own OS. Additionally, or alternatively, one or more of these devices may be a virtual device.

In certain embodiments, at least one device in heterogenous computing platform 200 may have updatable firmware which, upon installation, operates to change the performance, available features, settings, configuration options, API, drivers, and/or services provided by that device. For example, each update may be delivered to heterogenous computing platform 200 as a system-wide firmware installation package having a plurality of firmware components, and each firmware component may be distributed to its respective device (or corresponding memory space). In some implementations, the latest system-wide firmware installation package received by heterogenous computing platform 200 may be installed at every boot of IHS 100.

In the example of FIG. 2, heterogenous computing platform 200 includes CPU clusters 201A-N as a particular implementation of host processor(s) 101 intended to perform general-purpose computing operations. Each of CPU clusters 201A-N may include one or more processing core(s) and cache memor(ies). In operation, CPU clusters 201A-N are available and accessible to the IHS's host OS 300 (e.g., WINDOWS on ARM), optimization application(s) 312 (FIG. 3), OS agent(s) 313, and other application(s) 314 executed by IHS 100.

CPU clusters 201A-N are coupled to memory controller 202 via internal interconnect fabric 203. Memory controller 202 is responsible for managing memory accesses for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.). All devices coupled to internal interconnect fabric 203 can communicate with each other and with a host OS executed by CPU clusters 201A-N.

GPU 204 is a device designed to produce graphical or visual content and to communicate that content to a monitor or display, where the content may be rendered. PCIe interfaces 205 provide an entry point into any additional devices external to heterogenous computing platform 200 that have a respective PCIe interface (e.g., graphics cards, USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc.

In operation, input and/or output audio streams may pass through and be processed by aDSP 206, which can send the processed audio to other devices on internal interconnect fabric 203 (e.g., CPU clusters 201A-N). Also, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.). To that end, aDSP 206 may be coupled to BMU 112.

Sensor hub and low-power AI device 207 is a very low power, always-on device designed to consolidate information received from other devices in heterogenous computing platform 200, process any context and/or telemetry data streams, and provide that information to: (i) a host OS, (ii) other applications, and/or (iii) other devices in platform 200. For example, sensor hub and low-power AI device 207 may include General-Purpose Input/Output (GPIOs) that provide Inter-Integrated Circuit ($I^2C$), Improved $I^2C$ ($I^3C$), Serial Peripheral Interface (SPI), Enhanced SPI (eSPI), and/or serial interfaces to receive data from sensors (e.g., sensors 110, camera 210, peripherals 214, etc.).

Sensor hub and low-power AI device 207 may include an always-on, low-power core configured to execute small neural networks and specific applications, such as contextual awareness and other enhancements. In some embodiments, sensor hub and low-power AI device 207 may be configured to operate as an orchestrator device in charge of managing other devices, for example, based upon an ITDM/OEM policy or the like.

High-performance AI device 208 is a significantly more powerful processing device than sensor hub and low-power AI device 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks.

Display/graphics device 209 is designed to perform additional video enhancement operations. In operation, display/graphics device 209 may provide a video signal to an external display coupled to IHS 100 (e.g., display device(s) 111).

Camera device 210 includes an Image Signal Processor (ISP) configured to receive and process video frames captured by a camera coupled to heterogenous computing platform 200 (e.g., in the visible and/or infrared spectrum).

Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

In some cases, devices 209-211 may be coupled to internal interconnect fabric 203 via a secondary interconnect fabric (not shown). A secondary interconnect fabric may include any bus suitable for inter-device and/or inter-bus communications within an SoC.

Security device 212 includes any suitable security device, such as a dedicated security processor, a Trusted Platform Module (TPM), a TRUSTZONE device, a PLUTON processor, or the like. In various implementations, security device 212 may be used to perform cryptography operations (e.g., generation of key pairs, validation of digital certificates, etc.) and/or it may serve as a hardware root-of-trust (RoT) for heterogenous computing platform 200 and/or IHS 100.

Modem/wireless controller 213 is a device designed to enable all wireless communications in any suitable frequency band (e.g., BLUETOOTH or "BT," WiFi, CDMA, 5G, satellite, etc.), subject to AI-powered optimizations/customizations for improved speeds, reliability, and/or coverage.

Peripherals 214 may include any device coupled to heterogenous computing platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100.

In some cases, devices 212 and 213 may be coupled to internal interconnect fabric 203 via the same secondary interconnect serving devices 209-211 (not shown). Additionally, or alternatively, devices 212-213 may be coupled to internal interconnect fabric 203 via another secondary interconnect.

In various embodiments, one or more devices of heterogeneous computing platform 200 (e.g., GPU 204, aDSP 206, sensor hub and low-power AI device 207, high-performance AI device 208, VPU 211, etc.) may be configured to execute one or more AI model(s), simulation(s), and/or inference(s).

Figure 3:
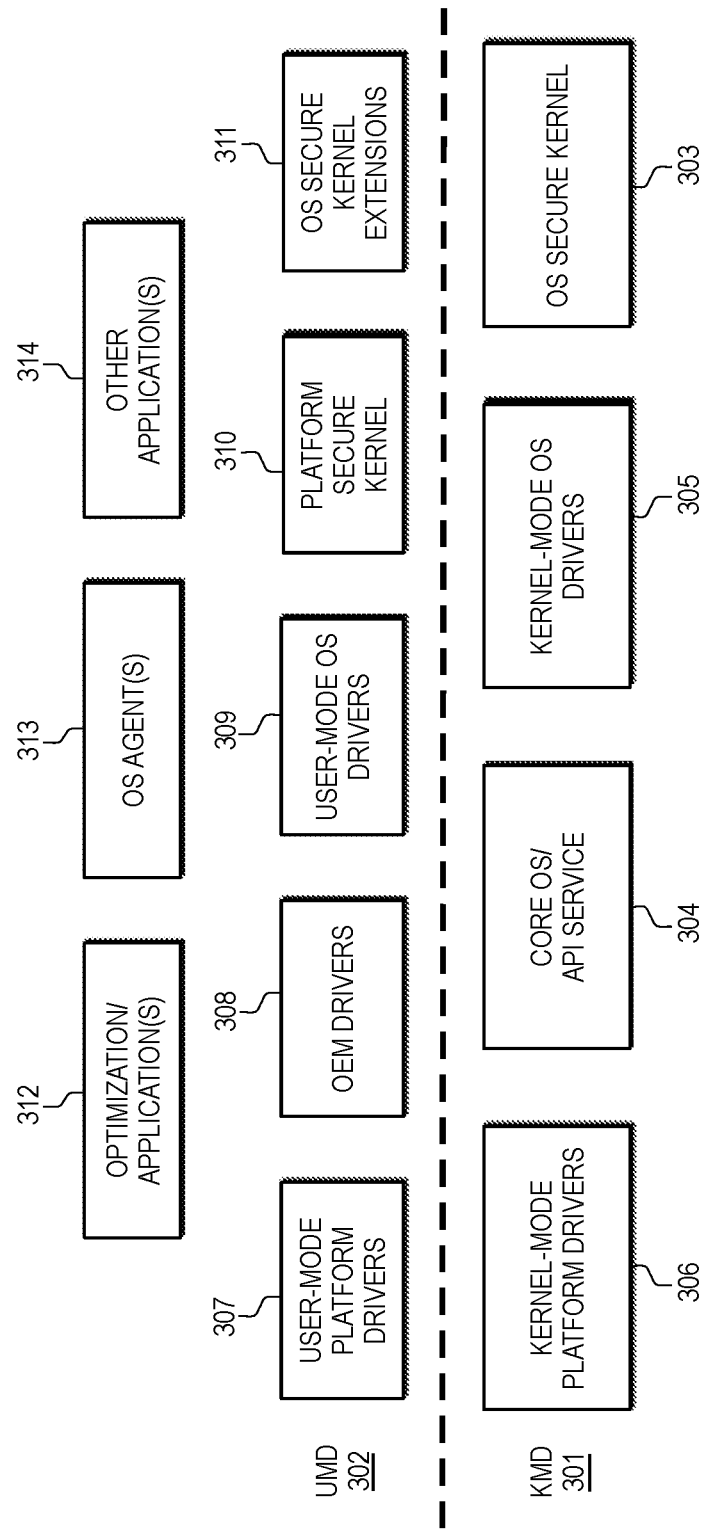
FIG. 3 is a diagram illustrating an example of a host Operating System (OS) executable by a heterogenous computing platform, according to some embodiments.

FIG. 3 is a diagram illustrating an example of host OS 300 executable by CPU clusters or cores 201A-N of heterogenous computing platform 200. In some cases, host OS 300 may be implemented as WINDOWS on ARM. As shown, host OS 300's stack includes kernel mode drivers (KMD) in kernel space 301 and user mode drivers (UMD) in user space 302.

In kernel space 301, OS secure kernel 303 is responsible for secure operations (e.g., encryption, validation, etc.) within IHS 100. Core OS/API service 304 has direct access to IHS components such as, for example, heterogenous computing platform 200. OS drivers 305 include kernel mode drivers developed by the OS publisher or other developer. Platform drivers 306 include kernel mode drivers developed by the manufacturer or vendor of heterogenous computing platform 200, for example, for use with devices 201-214.

In user space 302, user-mode platform drivers and services 307 enable access to features provided by devices 201-214 through kernel-mode platform drivers 306. OEM drivers 308 enable features in OEM devices coupled to IHS 100, and user-mode OS drivers and services 309 enable access to OS features through kernel mode OS drivers 305. Platform secure kernel 310 includes protected user-mode portions of host OS 300 developed by the manufacturer or vendor of heterogenous computing platform 200, and OS secure kernel extensions 311 include extensions to protected user-mode portions of host OS 300 developed by the OS publisher or other developer.

OS agent(s) 313 may include an OS agent or client configured to communicate with service(s) provided by an ITDM/OEM service to establish an in-band management channel. Moreover, other application(s) 314 may include or be a part of any workload executable by heterogenous computing platform 200. For example, other application(s) 314 may include productivity, collaboration, streaming, multimedia, or gaming applications executable by host OS 300.

Optimization application(s) 312 may include any host OS 300-level application configured to intelligently optimize the performance of IHS 100 (e.g., DELL OPTIMIZER), for example, by using AI models to dynamically configure IHS 100's settings and/or to optimize the performance of other applications 314. In operation, optimization application(s) 312 may improve the productivity, performance, and user experience through system usage analysis and learning. For example, optimization application(s) 312 may be invoked, within host OS 300, to learn how application 314 is used. Optimization application(s) 312 may identify optimization opportunities, classify users, and automatically apply appropriate settings (e.g., storage, memory, and/or CPU) to improve application 314's performance.

At least one of applications 312-314 may be configured to utilize one or more devices, features, or services exposed, surfaced, enumerated, or otherwise made available by user-mode drivers 307-309, for example, through a Human Interface Device (HID) interface and/or an HID report provided by host OS 300, or the like.

In various implementations, host OS 300 may be configured to receive a firmware installation package or executable file containing at least one extension driver (e.g., a setup information or "INF" text file in a driver package) from an ITDM/OEM service via a management channel. The installation package may be processed by a UEFI UpdateCapsule process when distributed as part of an OS update, as a system-wide and/or device-specific firmware update, and/or it may be distributed by OEM update applications such as DELL COMMAND UPDATE, integrated with remote deployment and update management tools.

Firmware components of each extension driver may be loaded, attached, or extended onto user-mode platform drivers and services 307, and may be communicated by user-mode platform drivers and services 307 to respective devices of heterogenous computing platform 200 through kernel-mode platform drivers 306 for installation, update, or execution of such firmware components in those devices.

As such, the deployment of extension drivers by host OS 300 as OEM drivers 308 provides value-added features or services to user-mode platform drivers (e.g., base drivers) 307 and/or applications 312-314. Particularly, OEM drivers 308 may expose custom services and routines provided by any one of devices 201-214 upon execution of their corresponding firmware components.

Figure 4:
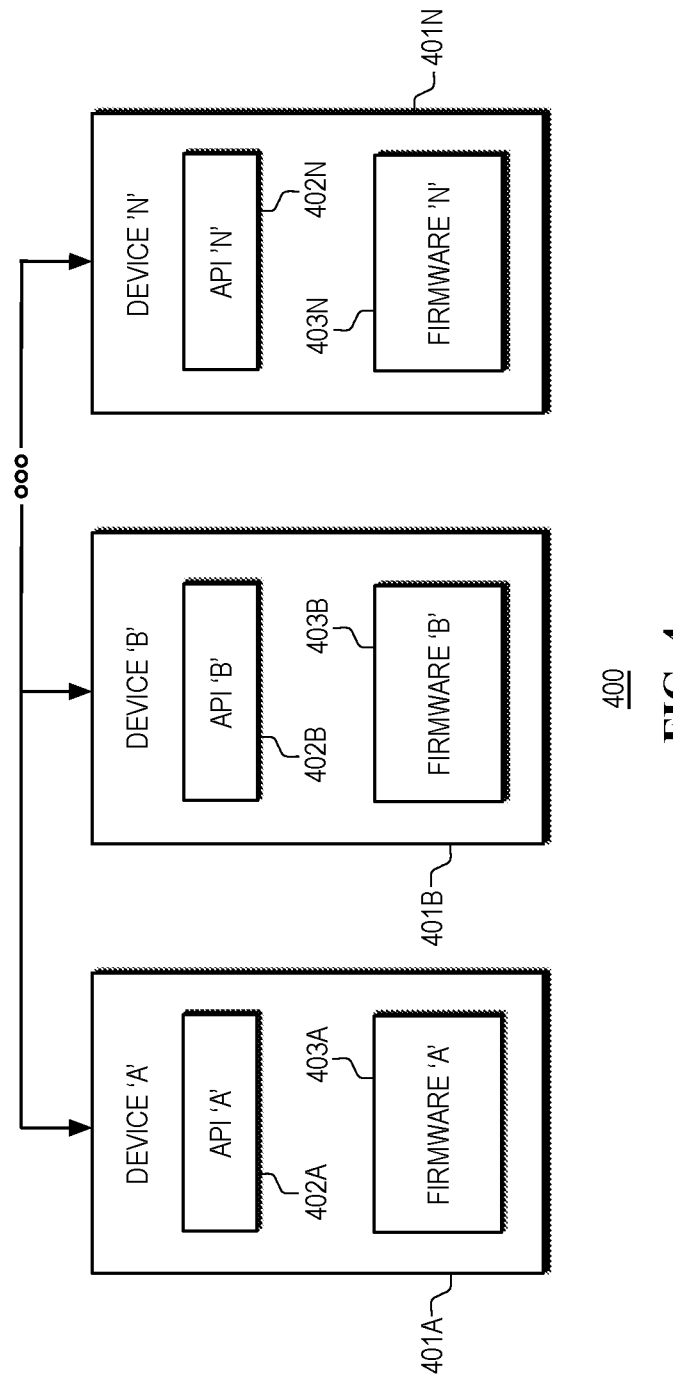
FIG. 4 is a diagram illustrating an example of host OS-independent, autonomous inter-device communications in a heterogenous computing platform, according to some embodiments.

FIG. 4 is a diagram illustrating an example of host OS-independent, autonomous inter-device communications 400 in heterogeneous computing platform 200. Particularly, each of devices 401A-N may implement any of devices 201-214 of heterogenous computing platform 200.

Each of APIs 402A-N provides access to firmware 403A-N executed by a corresponding device 401A-N. In operation, each firmware component 403A-N may exchange data and commands directly with each other using APIs 402A-N. Through APIs 402A-N, one or more of devices 401A-N may be configured to enable, disable, or modify firmware services provided by other devices 403A-N. For example, in some embodiments, one or more of devices 401A-N may be designated as an orchestrator upon booting of platform 200.

In various embodiments, firmware services resulting from the execution of firmware 403A-N may be provided by their respective device 401A-N to other devices 401A-N within heterogeneous computing platform 200 autonomously and/or independently of the operation of host OS 300. Communications between executing firmware 403A-N and applications 312-314 may take place through OEM drivers 308. In some cases, executing firmware 403A-N may be identified by or exposed to host OS 300 and/or applications 312-314 as part of an HID report.

Firmware 403A-N and corresponding OEM drivers 308 may be installed, modified, updated, and/or removed from IHS 100 upon each installation of a firmware installation package for the entire heterogenous computing platform 200, for instance, at each boot of IHS 100. For example, each firmware component 403A-N providing a respective firmware service may be delivered to a respective device 401A-N as an extension driver. Upon execution, these firmware services may provide additional controls over the management, deployment, customization, and/or configuration of IHS 100 to an ITDM/OEM that are independent of updates to host OS 300 and/or applications 312-314.

In other embodiments, any given one of devices 401A-N may be rebooted or reset independently of the other devices to perform a local installation, update, or modification of that device's firmware services without having to reboot the entire heterogenous computing platform 200 and/or IHS 100. Additionally, or alternatively, one or more of devices 401A-N may have its firmware service at least partially installed or updated without rebooting or resetting the device.

As discussed above, systems and methods described herein may integrate EC 109 into heterogenous computing platform 200 of IHS 100. For example, in the implementations shown in FIGS. 5A and 5B, components of EC 109 (e.g., core, peripheral devices, etc.) may be fully or partially integrated into heterogeneous computing platform 200. In another implementation shown in FIG. 5C, however, EC 109 may be completely external to platform 200 but coupled to a bridge integrated therein via an interface (e.g., enhanced SPI or "eSPI") to provide or maintain the EC's ability to access the SoC's internal interconnect fabric. In each of these scenarios, EC 109 may be configured to operate as an orchestrator instead of (or along with) sensor hub and low-power AI device 207.

Figure 5A:
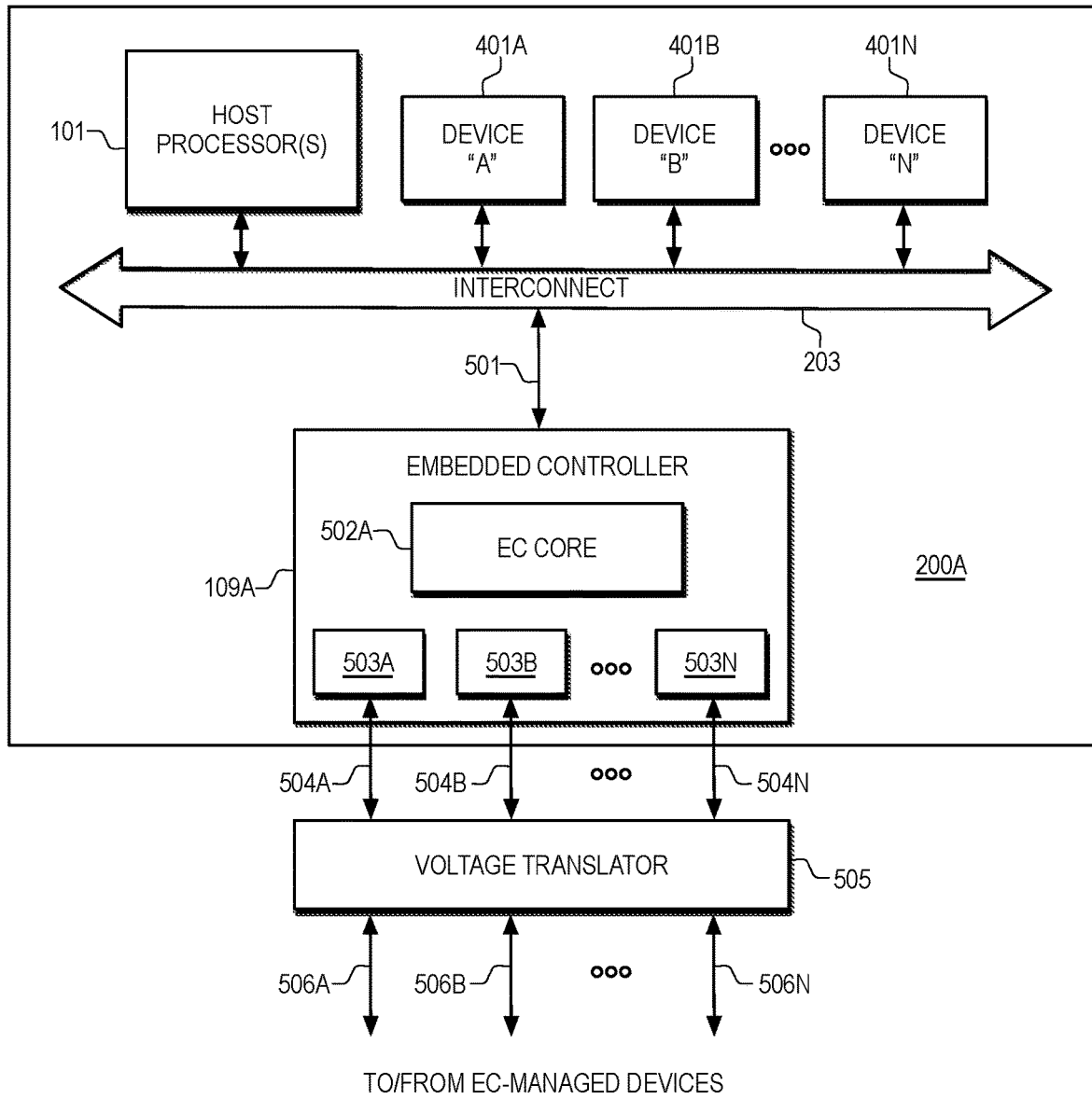
FIGS. 5A-C are diagrams illustrating examples of different degrees of integration of an Embedded Controller (EC) in a heterogenous computing platform, according to some embodiments.

Particularly, FIG. 5A is a diagram illustrating example 500A of EC 109A integrated into heterogenous computing platform 200A. In this embodiment, EC 109A is fully integrated within the SoC and it is coupled to internal interconnect fabric 203 via internal bus or interconnect access 501. EC 109A may include EC processing core 502A (e.g., another ARM core) and a plurality of peripheral devices 503A-N.

Examples of peripheral devices 503A-N include, but are not limited to: an Inter-Integrated Circuit (I2C) bus controller, a Pulse Width Modulator (PWM), a tachometer (TACH), a GPIO controller, a serial peripheral interface (SPI) Flash, a fan controller, an Analog-to-Digital Converter (ADC), etc.

Each of peripheral devices 503A-N may be coupled to a corresponding pin or terminal of SoC 200A. The operating voltage of heterogenous computing platform 200A is typically lower than the operating voltage of external EC-managed devices (e.g., cooling fans, etc.), which means that, ordinarily, peripheral devices 503A-N would not be able to communicate with them. To address this problem, voltage translator 505 may be coupled to peripheral devices 503A-N through low-voltage connections 504A-N (via corresponding pins of the SoC) and to EC-managed devices (not shown) via high-voltage connections 506A-N.

In operation, voltage translator 505 may be configured to increase the voltage of signals transmitted from peripheral devices 503A-N to EC-managed devices (e.g., from 1.2 or 1.8 V to 3.3 V). Voltage translator 505 may also be configured to reduce the voltage of other signals transmitted from EC-managed devices to peripheral devices 503A-N (e.g., from 3.3 V to 1.8 or 1.2 V).

Figure 5B:
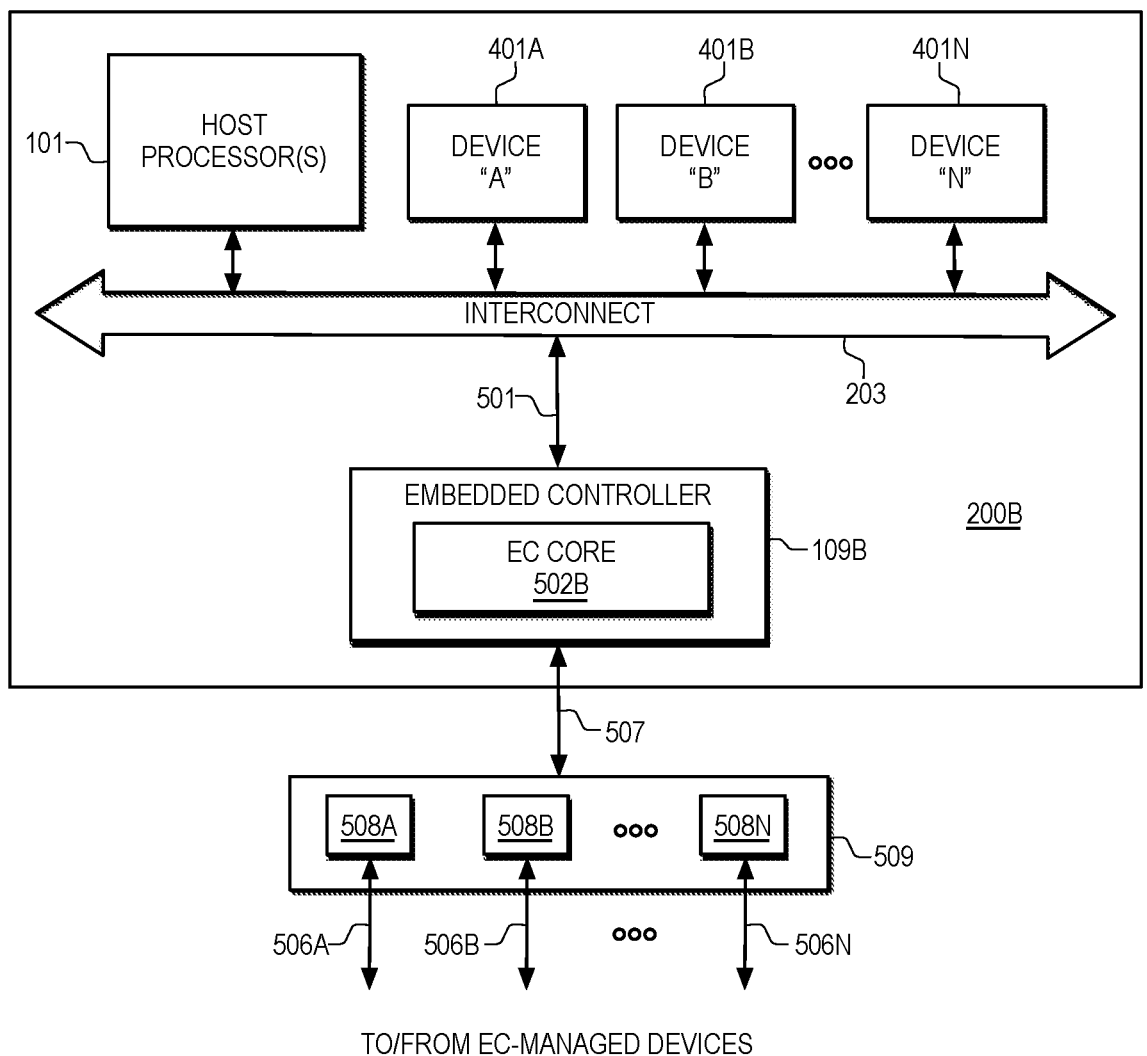

FIG. 5B shows a diagram of example 500B of EC 109B partially integrated into heterogenous computing platform 200B. In contrast with example 500A, here only EC core 502B is integrated into the SoC and peripheral devices 508A-N (e.g., similar to peripheral devices 503A-N, but with different operating voltages) are provided in separate package 509 mounted on the IHS motherboard, apart from the SoC.

To communicate with peripheral devices 503A-N, EC core 502B may be coupled to package 509 via connection or bus 507, such as a SPIbus (e.g., 1.2 V, 100 MHZ). In this manner, example 500B reduces the number of pins (e.g., ~100 fewer pins or more) on the SoC that would otherwise be required to enable all EC operations. Moreover, because peripheral devices 503A-N are external to EC 109B, they may interface with EC-managed devices directly over 506A-N using their native voltages (e.g., 3.3 V), and therefore voltage translator 505 of example 500A is not required.

As such, in examples 500A and 500B, EC 109A/B may power up as soon as SoC 200A/B comes out of reset. In some cases, Microcontroller Unit (MCU) 500A/B may own a local SRAM program store that is loaded once when coming out of reset, and which does not rely on an external DRAM to be initialized and able to run. In other implementations, such internal memory may be Flash-based.

Accordingly, EC 109A/B may have access to all the SoC 200A/B's internal resources, and especially early access to the SoC 200A/B's GPIOs for early hardware bring-up control points, such as power rails or other activities otherwise typically reserved for a Power Management Controller (PMIC). Moreover, EC 109A/B may have access to the SoC 200A/B's internal hardware interconnect bus 203 to enable special or enhanced operations not currently possible with x86 architectures.

Figure 5C:
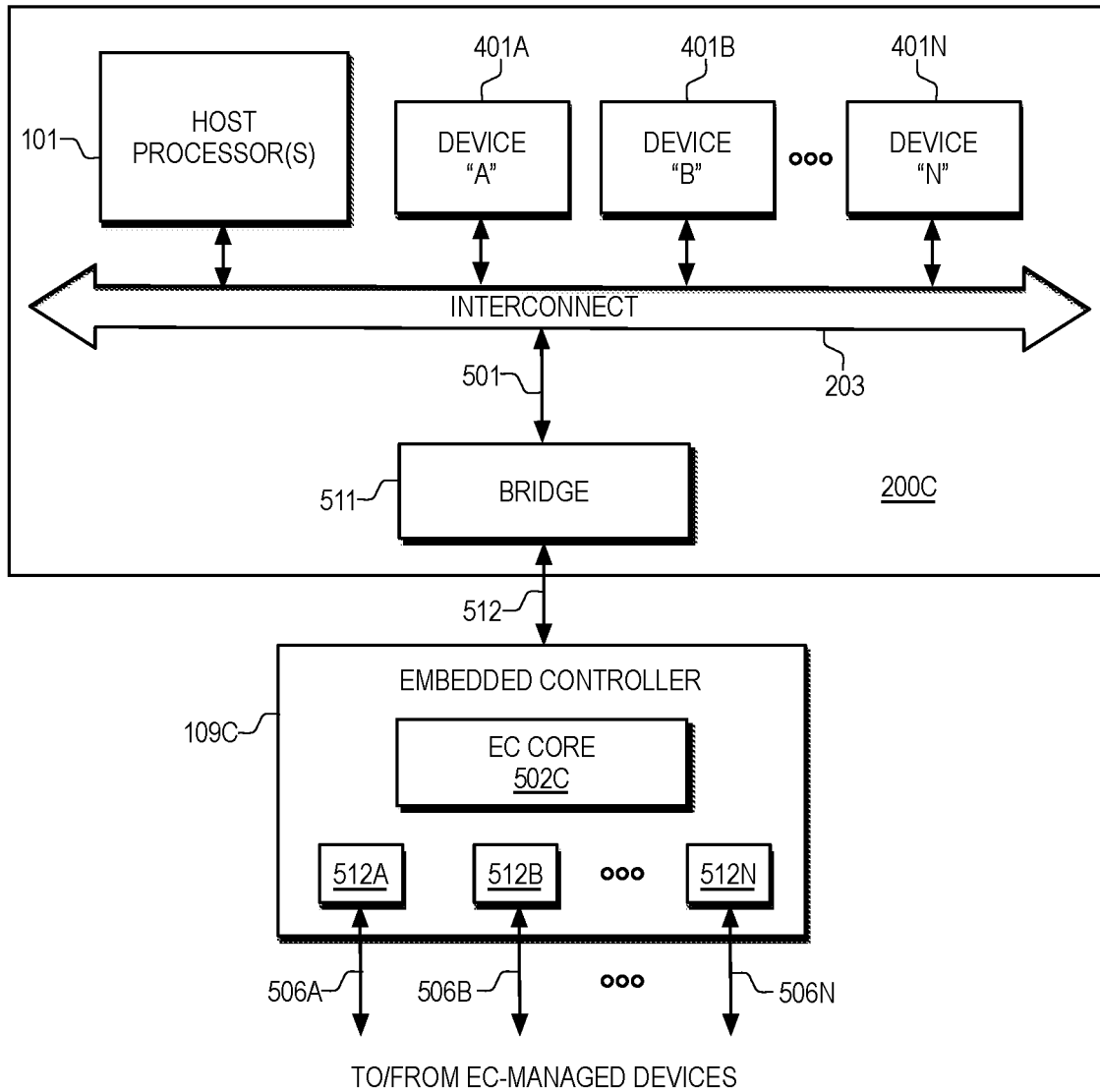

FIG. 5C shows a diagram of example 500C of EC 109C externally disposed with respect to heterogenous computing platform 200C. In contrast with examples 500A/B, here both EC core 502C and peripheral devices 512A-N are provided in a discrete package mounted on the IHS motherboard. The SoC includes bridge 511 coupled to internal interconnect fabric 203 via internal bus or interconnect access 510, and EC 109C is coupled to bridge 511 via high-speed bus or interface 512, which may be an eSPI interface or the like (such as a derivative of PCIe type protocols at the hardware level).

In example 500C, the deployment of eSPI bus 512 may prevent bottlenecks in the EC's operations that would result if other types of interfaces (e.g., I²C) were used. For instance, eSPI bus 512 between the SoC and EC 109C may enable the EC 109C to run multiple parallel features concurrently. Also, eSPI bus 512 provide the capability to virtualize GPIOs using "virtual wires," whereby EC 109C may access the GPIO status over eSPI instead of going through the physical GPIO hardware layer.

Furthermore, high-speed interface 512 may provide EC 109C with full connectivity to the internal SoC fabric. For example, in a scenario where host processor(s) 101 fails to boot, eSPI bus 512 may allow EC 109C to access and/or run most or all of devices 401A-N (e.g., PCIe bus, USB controllers, network controllers, graphics controllers, system memory, etc.) directly.

As such, example 500C may be used, for example, to provide pre-boot, on-demand services based upon EC 109C; which is not currently possible with existing SoCs (or in x86 architectures). EC 109C is generally verifiable to be a trusted device, thus once that trust is established, having access to key SoC resources no longer presents attack vector concerns. For example, in various implementations, EC 109C may have sideband read/write access to hard drive 113, an SSD, or an NVMe coupled to platform 200.

A possible benefit or advantage of enabling external EC 109C over internal ECs 109A/B is the ability to operate GPIOs at different voltage levels than the SoC. Another possible benefit or advantage of external EC 109C versus internal ECs 109A/B includes reducing the GPIO pin count of the SoC, especially in implementations where the SoC's footprint is already saturated with GPIOs and a designer is forced to grow the size of the SoC to accommodate potentially hundreds of additional GPIO pinouts.

In various embodiments, systems and methods described herein may enable OOB management of heterogeneous computing platform 200 in low-power states (e.g., S5, G3, any power state where only the RTC voltage rails are on, etc.).

Figure 6:
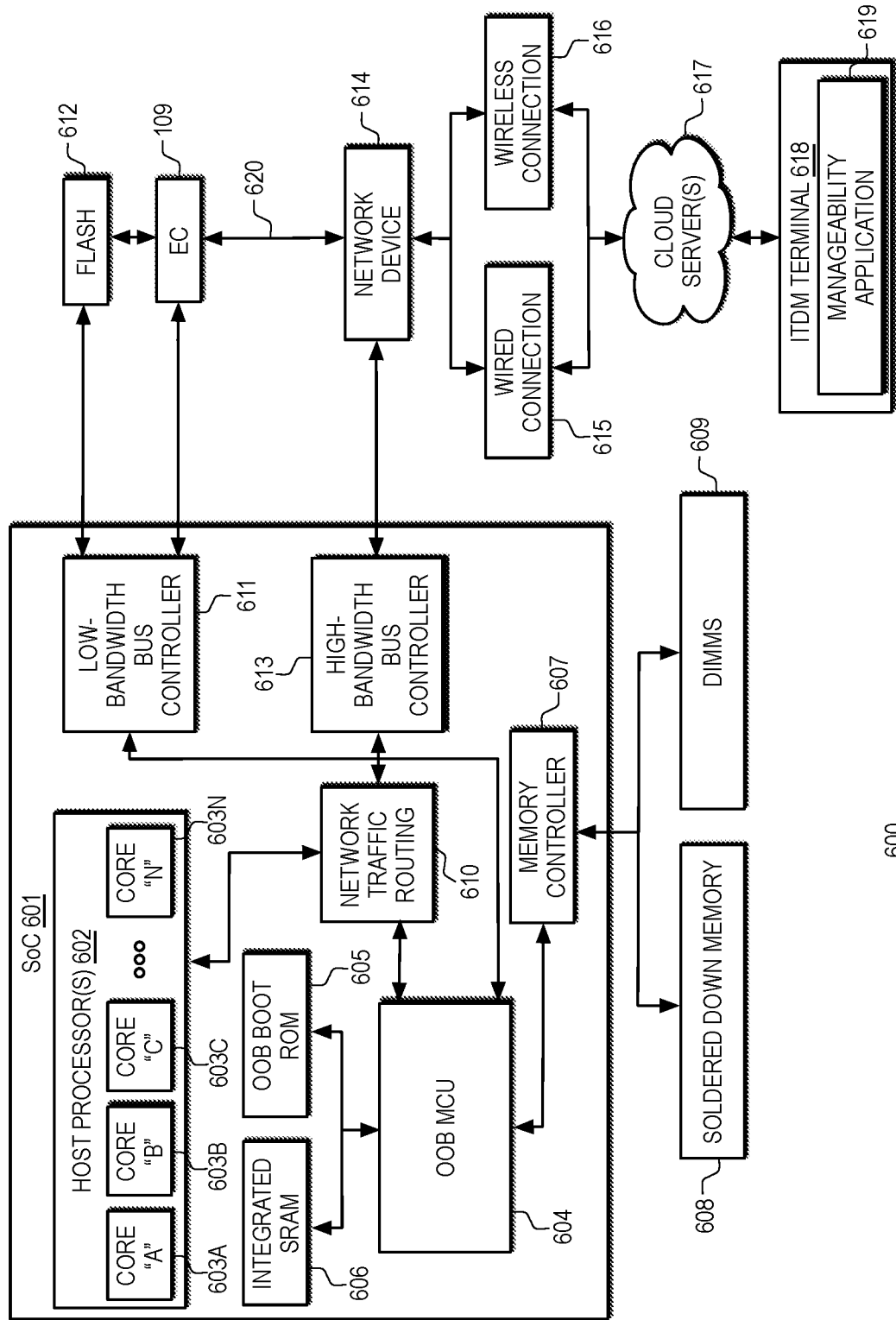
FIG. 6 is a diagram illustrating an example of a heterogenous computing platform architecture for enabling Out-of-Band (OOB) management, according to some embodiments.

In that regard, FIG. 6 is a diagram illustrating an example of heterogenous computing platform architecture 600 for enabling OOB management. In this example, heterogeneous computing platform 200 of FIG. 2 or the like may be implemented in the form of SoC 601 within IHS 100, such that host processor(s) 101 are implemented as host processor(s) 602 having main cores (or application processors) 603A-N configured to execute BIOS/UEFI 107 and host OS 300.

SoC 601 includes integrated OOB MCU 604. OOB MCU 604 may include a processing core integrated into SoC 601 but that is otherwise separate and independent from any of main cores 603A-N of processor 602. In various embodiments, OOB MCU 604 may belong to its own power domain, and it may be more power efficient than main cores 603A-N (typically with less processing capabilities), but less power efficient that EC 109 (typically with greater processing capabilities). In contrast with host processor(s) 602, OOB MCU 604 may not run any components of host OS 300 (or BIOS/UEFI 107), and it may be invisible to any host OS 300 and/or or BIOS/UEFI 107 running in main cores 603A-N.

As shown, OOB MCU 604 may be coupled to (or include): OOB boot Read-Only Memory (ROM) 605, integrated static RAM (SRAM) 606, memory controller 607, and network traffic routing controller 610.

OOB ROM 605 includes program instructions and/or firmware that enable OOB MCU 604 to start and maintain its operations (e.g., Real-Time OS or "RTOS" code), including certain operations described in more detail below. Integrated SRAM 606 is usable by OOB MCU 604 as its working memory during such operations.

Within IHS 100, memory controller 607 may provide OOB MCU 604 with access to system memory 103, here implemented as soldered down memory 608 (e.g., fixed Double Data Rate Synchronous Dynamic Random-Access Memor(ies) or "DDR SDRAM" memor(ies)) and/or Dual In-line Memory Modules or "DIMMs" 609 (e.g., removable DDR memor(ies)) within IHS 100 for additional processing capabilities.

Network traffic routing controller 610 is configured to manage both in-band network traffic from host-processor cores 602 (e.g., generated or processed by host OS 300) and OOB network traffic from OOB MCU 604 (e.g., generated or processed by executing firmware stored in OOB ROM 605), for example, when IHS 100 and/or SoC 601 are both in S0, using any suitable arbitration technique.

When operating in G3 or S5, the path between network traffic routing controller 610 and host processor(s) 602 is off, and network traffic routing controller 610 exclusively handles OOB traffic to/from OOB MCU 604.

In cases where BIOS/UEFI 107 is launched during a G3 Sniff operation and requires the use of network device 614, however, network traffic routing controller 610 may arbitrate inbound and outbound traffic between OOB MCU 604 and host processor(s) 602 while SoC 601 is otherwise in G3 (or S5).

To manage in-band and OOB packet traffic, packets may be interleaved using an interleaving policy. For example, such interleaving policy may include one or more rules dictating that network traffic routing controller 610 route a maximum number or amount of OOB packets or data to or from OOB MCU 604 only after routing a minimum number or amount of in-band packets or data to or from host processor(s) 602.

Moreover, in various implementations, in order to make a distinction between packets directed to OOB MCU 604 and/or host processor(s) 602, network traffic routing controller 610 may be configured to examine the header of each packet and determine whether it is an OOB packet or an in-based backed based upon a header indication. The header indication may inform network traffic routing controller 610 that the packet is an OOB packet, and/or it may include destination information (e.g., an identification of OOB MCU 604).

In some cases, network traffic routing controller 610 may be configured to apply a routing priority policy to determine which packets should be routed to its respective destination first. For example, network traffic routing controller 610 may store a look-up table of OOB commands or types of commands that, when included in an OOB packet, give that OOB packet routing priority over in-band packets (e.g., a "kill pill" command).

Network traffic routing controller 610 provides OOB MCU 604 with access to low-bandwidth bus controller 611 and high-bandwidth bus controller 613. In operation, network traffic routing controller 610 may be configured to arbitrate and/or multiplex in-band packet traffic to/from host processor(s) 602 with OOB packet traffic to/from OOB MCU 604.

In architecture 600, OOB MCU 604 may be coupled to network traffic routing controller 610 via a first portion of a high-speed bus (e.g., PCIe, USB Type-C or 3.0, I$^3$C, eSPI, etc.), network traffic routing controller 610 may be coupled to high-bandwidth bus controller 613 via a second portion of the high-speed bus, and high-bandwidth bus controller 613 may be coupled to network device 614 via a third portion of the high-speed bus. In some cases, the first, second, and/or third portions of the high-speed bus may use the same or a different protocol.

In some cases, the use of a high-speed bus or protocol for incoming and outgoing communications between OOB MCU 604 and network device 614 (independent of the power state of host processor(s) 602, such as during a G3 Sniff operation) may prevent bottlenecks in the OOB MCU 604's operations that would result if other types of interfaces (e.g., slow-speed interfaces, such as I$^2$C) were used.

In various embodiments, network traffic routing controller 610 may provide OOB MCU 604 with the ability to share the same wireless device (e.g., network device 614) that IHS 100 uses for host OS 300's runtime. When in a low-power modes or pre-boot mode, OOB MCU 604 fully owns the wireless/wired interface; however, in cases where host OS 300 is up and running, port addressing logic within network traffic routing controller 610 may redirect traffic dedicated to OOB MCU 604 for receiving packets, and OOB MCU 604 may also be able to send outgoing packets to be merged with host OS 300-level network traffic, even when host OS 300 is running, while protecting the OOB network traffic from OS sniffing at the hardware level.

In situations where host OS 300 hangs (e.g., Blue Screen of Death or "BSOD"), OOB MCU 604 may take over network traffic routing controller 610. A dual-ported memory may allow simultaneous access to the network device 614 by both network traffic routing controller 610 and host OS 300's drivers.

Moreover, power state transitions may alert or notify OOB MCU 604, upon or preceding entry into Modern Standby, that OOB MCU 604 may make low power use of the network layer without waking host processor(s) 602 and/or host OS 300 (e.g., less OOB network traffic during Modern Standby than during S0).

Low-bandwidth bus controller 611 (e.g., I²C, I³C, Low-Pin Count or "LPC," etc.) is coupled to flash memory 612, which is configured to store EC firmware, BIOS firmware, etc., and to EC 109. EC 109 may also be coupled directly to flash memory 612 through any suitable interface.

High-bandwidth bus controller 613 (e.g., PCIe interface 205, USB Type-C or 3.0, etc.) is coupled to networking hardware, component(s), or device(s) 614 (e.g., modem, wireless controller, LAN, WiFi, cellular, satellite, BT, etc.). Network device 614 may be capable of communicating with cloud server(s) 617 via wired connection 615 (e.g., Ethernet, fiber optics, etc.) and/or wireless connection 616 (e.g., WiFi, cellular, etc.). EC 109 may also have a direct connection to network device 614 via sideband bus 620 (e.g., I³C, eSPI, etc.).

In various embodiments, the terms low-bandwidth bus controller 611 and high-bandwidth bus controller 613 are meant to illustrate that the data speeds of controller 613 are greater than the bus speeds of controller 611; sometimes by two or more orders of magnitude (e.g., PCIe versus I²C).

Cloud server(s) 617 may be accessible by ITDM terminal or console 618, which executes or otherwise includes manageability application 619. In some cases, cloud server(s) 617 and ITDM terminal 618 may each be implemented as different instances of IHS 100.

In some implementations, EC 109 may be at least partially integrated into SoC 601 (e.g., FIGS. 5A and 5B). In other implementations, flash memory 612 and network device 614 may also be integrated as one of devices within SoC 601. In yet other implementations, OOB MCU 604 may be disposed outside of SoC 601 (e.g., within EC 109 or on its own, as a discrete processor or controller).

The inventors hereof have identified a desire to support OOB manageability capabilities, particularly when IHS 100 and/or SoC 601 is in a low-power state, such as S5 or G3. The G3 state in x86 designs for mobile IHSs is currently defined to as when AC is absent and the IHS is turned off. Desktop IHSs predominantly remain in S5 mode because its AC power source is generally continuously present, except in special cases where the IHS is disposed in a location prone to blackouts, or in applications where all Point-of-Sale (POS) IHSs are switched off on a nightly basis, for example. Currently, in the G3 state, an EC does not run any firmware and the IHS is generally unable to support any OOB manageability operations.

To address these issues, systems and methods described herein enable EC 109 to perform "G3 Sniffing," "Low-power Sniffing," "OOB Sniffing," and/or "OOB packet Sniffing" operations, whereby EC 109 comes up periodically out of G3 state using an RTC timer to "sniff" for any OOB manageability packets, commands, or messages targeted to that individual IHS and stored in cloud server(s) 617.

The duty cycle of EC 109's sniff operations may be selected to be anywhere from a very low duty cycle (e.g., less than 2% of the time) to a very high duty cycle (e.g., more than 70% of the time), with a tradeoff between responsiveness and power consumption.

Unlike other technologies where an MCU wakes up following a given duty cycle in order to reduce a device's power consumption, systems and methods described herein enable EC 109 to temporarily wake up from ultra-low power mode (e.g., G3) for the purpose of sniffing OOB manageability packets, commands, or messages, and to return to such ultra-low power mode upon competition of the G3 sniff.

Using these systems and methods, EC 109 may employ an RTC timer to wake periodically (e.g., at the expiration or completion of the timer's countdown) to check, using network device 614, for any pending OOB manageability packets, commands, or messages addressed to that particular IHS. Moreover, power rail controls may be implemented such that during G3 sniff state, when EC comes out of G3 via RTC timer, the power island or domain of network device 614 is also energized to allow it to check cloud service(s) 617 for any pending OOB manageability packets, commands, or messages.

Figure 7:
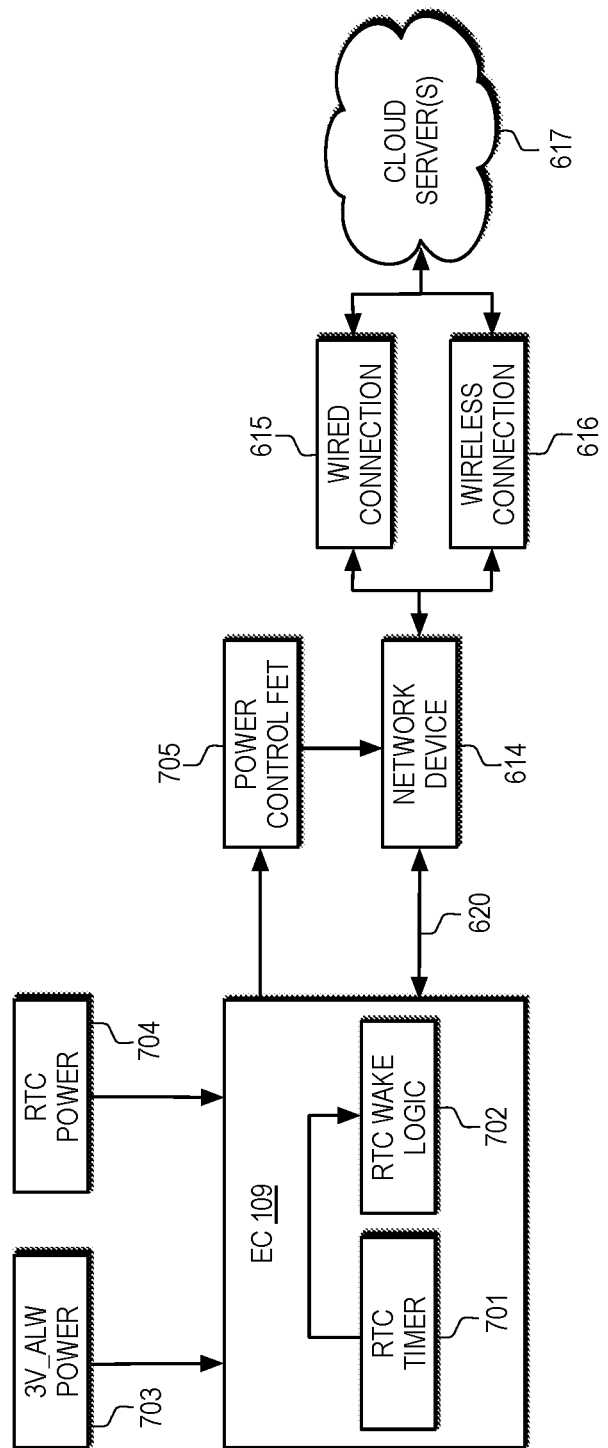
FIG. 7 is a diagram illustrating an example of a heterogenous computing platform architecture for EC-based OOB packet sniffing from a low-power state, according to some embodiments.

FIG. 7 is a diagram illustrating an example of heterogenous computing platform architecture 700 for EC-based OOB packet sniffing from a low-power state. In this embodiment, EC 109 is coupled to RTC power 704 (e.g., a CMOS battery) and 3V_ALW power rail 703 (an "always-on" voltage rail), and it includes RTC timer 701 and RTC wake logic 702.

EC 109 is also coupled to power control Field-Effect Transistor (FET) or switch 705, which in turn is coupled to network device 614.

While in G3 mode, EC 109 is configured to receive power from RTC power 704. When RTC timer 701 is triggered, it sends a signal to RTC wake logic 702 which wakes up EC 109, at least in part, by switching its power from RTC power 704 to 3V_ALW power 703. When EC 109 is sufficiently operational, it sends a GPIO signal to power control FET 705, which also brings network device 614 out of G3 so that EC 109 may trigger and/or facilitate, through sideband bus 620, network device 614's sniff operations from cloud service(s) 617 through wired connection 615 or wireless connection 616.

If there are no OOB manageability packets, commands, or messages to be retrieved and/or performed, or upon completion of these operations, EC 109 and network device 614 may return to G3. Other devices within SoC 601 not involved during such operations (e.g., host processor(s) 602) may remain in G3 mode during the G3 sniffing.

Although shown as being performed by EC 109, in other situations, the entity performing the aforementioned operations may be OOB MCU 604, in which case OOB MCU 604 may include blocks 701-704, and it may be coupled to power control FET 705 to wake up network device 614.

Figure 8:
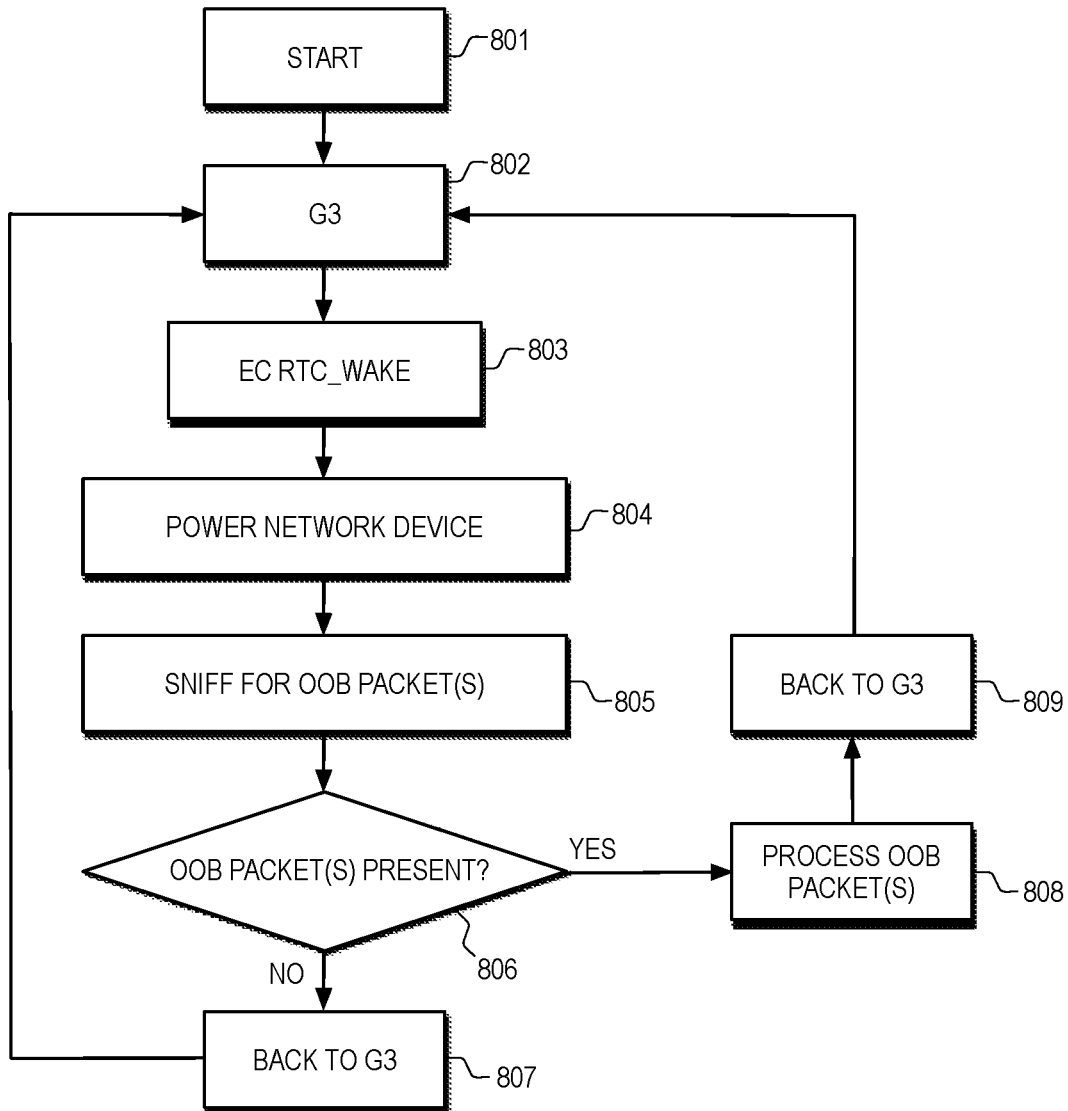
FIG. 8 is a diagram illustrating an example of a method for EC-based OOB packet sniffing from a low-power state, according to some embodiments.

FIG. 8 is a diagram illustrating an example of method 800 for EC-based OOB packet sniffing from a low-power state. In various embodiments, method 800 may be performed, at least in part, by EC 109 in cooperation with network device 614.

Particularly, method 800 starts at 801. At 802, IHS 100 is in a low power state, such as G3, receiving power from RTC power 704. At 803, RTC timer 701 issues a signal to RTC wake logic 702, which proceeds to switch EC 109 from RTC power 704 to 3V_ALW power 703.

At 804, EC 109 issues a GPIO signal to power control FET 705 to wake up network device 614. In some cases, at 804, the same (or a different) GPIO signal may also wake up network traffic routing controller 610.

At 805, EC 109 may send and receive messages to/from cloud server(s) 617 via wired connection 615 or wireless connection 616, including querying for OOB manageability packets, commands, or messages targeting its IHS, for example, by checking the status of a command buffer (e.g., by sending a message asking whether such buffer exists and/or how many OOB manageability packets, commands, or messages have been queued) associated with that IHS.

At 806, EC 109 determines whether cloud server(s) 617 has OOB manageability packets, commands, or messages queued or buffered for its IHS (e.g., by receiving a response or acknowledgement from cloud server(s) 617). If not, at 807, EC 109 turns off power control FET 705 and both EC 109 and network traffic routing controller 610 return to G3. EC 109 may restart its RTC timer 701, disconnect from 3V_ALW power 703, and connect to RTC power 704.

If so, at 808, EC 109 may process OOB manageability packets, commands, or messages retrieved from cloud server(s) 617 before returning to G3 at 809. In some cases, such a packet may request execution of a command that requires EC 109 to wake up other components in SoC 601 such as, for example, OOB MCU 604 (e.g., via another power control FET).

Additionally, or alternatively, if a command involves a BIOS or OS update, for example, EC 109 may wake up host processor(s) 602 (e.g., with another power control FET) and/or the entire SoC 601. After 807 or 808, control returns to 802.

An alternative approach to architecture 700 of FIG. 7 includes configuring network device 614 to wake itself up intermittently and to check for OOB manageability packets, commands, or messages targeted for IHS 100. In those cases, power rail support allows both EC 109 and networking hardware 104 to remain in G3 enabled by the RTC rail until a periodic timer wakes networking hardware 104 and until networking hardware 104 wakes up EC 109. Network hardware 614 may be disposed on a power island similar to the RTC low power rail and it may use an RTC low power timer to periodically wake from the G3 state (i.e., instead of EC 109 doing the wake from G3 from RTC power rail).

After network device 614 wakes up, it may either: (1) go back to sleep if no OOB manageability packets, commands, or messages are pending for that IHS, or (2) send a wake alarm to EC 109 to indicate there is work to be done. The wake alarm to EC 109 may be communicated via a VBAT-Powered Control Interface (VCI) or GPIO pin/logic such that EC 109 may wake from the G3 state in order to process the pending management command in conjunction with network device 614.

Figure 9:
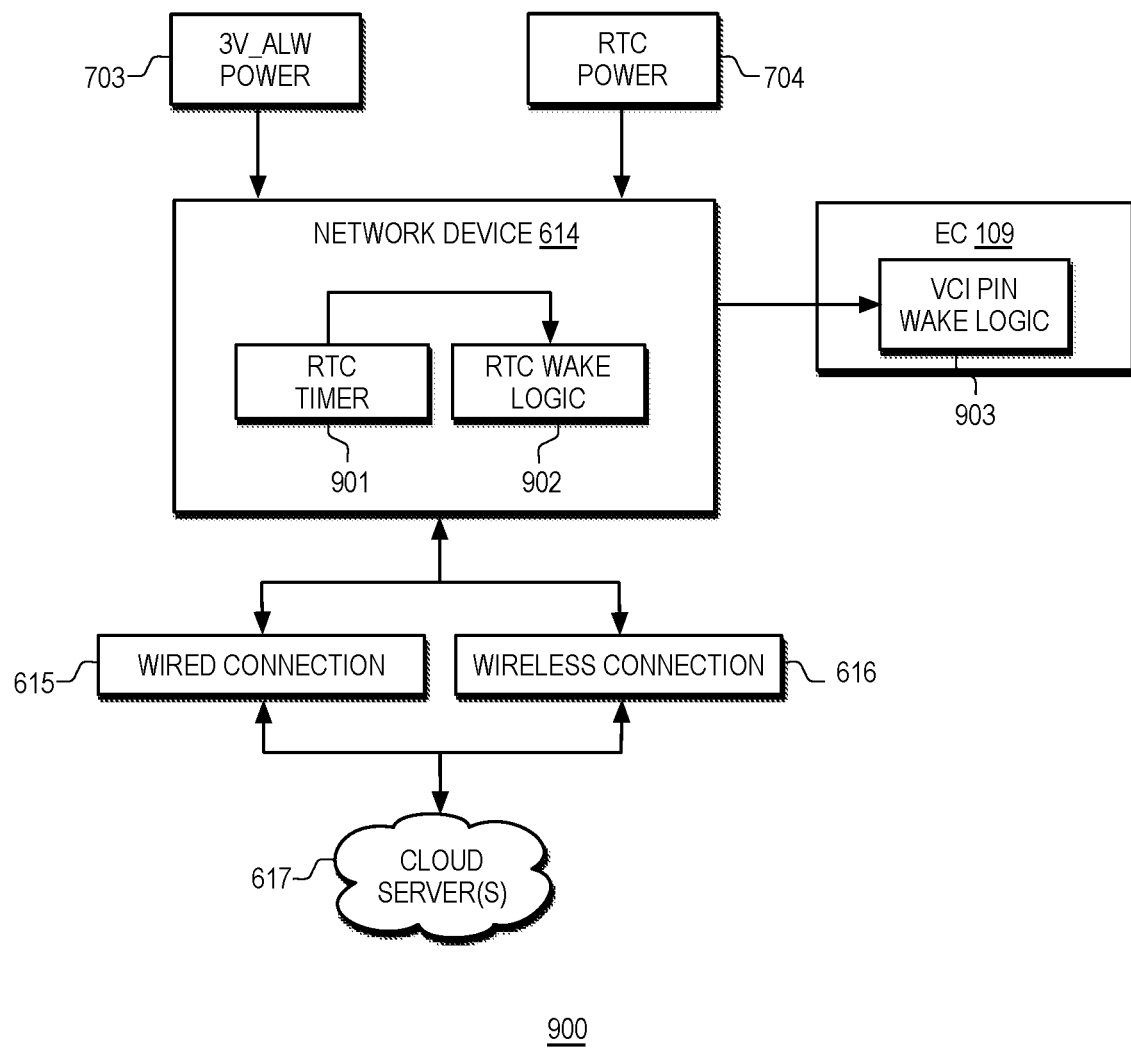
FIG. 9 is a diagram illustrating an example of a heterogenous computing platform architecture for networking-based OOB packet sniffing from a low-power state, according to some embodiments.

FIG. 9 is a diagram illustrating an example of heterogenous computing platform architecture 900 for networking-based OOB packet sniffing from a low-power state. In this embodiment, network device 614 is coupled to RTC power 704 and 3V_ALW power rail 703 (an "always-on" voltage rail), and it includes RTC timer 901 and RTC wake logic 902. Network device 614 is also coupled to VCI pin wake logic 930 within EC 109.

Network device 614 is configured to receive power from RTC power 704 while in G3 mode. When RTC timer 901 is triggered, it sends a signal to RTC wake logic 902 which wakes up network device 614, at least in part, by switching its power from RTC power 704 to 3V_ALW power 703. When network device 614 is sufficiently operational, it may send a VCI signal to VCI pin wake logic 903, which brings EC 109 out of G3 so that EC 109 may process packets received through network device 614's sniff operations from cloud service(s) 617 through wired connection 615 or wireless connection 616.

In various embodiments, network device 614 may be configured to only wake EC 109 if there are pending data packets found in cloud service 617. If no packets associated with IHS 100 are pending, only network device 614 wakes up momentarily, then goes back to G3, without waking up EC 109.

Upon completion of OOB operations, EC 109 and network device 614 return to G3. Moreover, other devices within SoC 601 not required during such operations (e.g., host processor(s) 602) may remain in G3 mode.

In the case of wired networking (LAN), architecture 900 may also receive a "magic packet" and wake EC 109 to process the packet if the packet is addressed to EC 109. Circuitry within network device 614 may be segmented to a very low power island only looking for magic packets, and additional power may be provided when the magic packet match has been confirmed by such circuitry.

Figure 10:
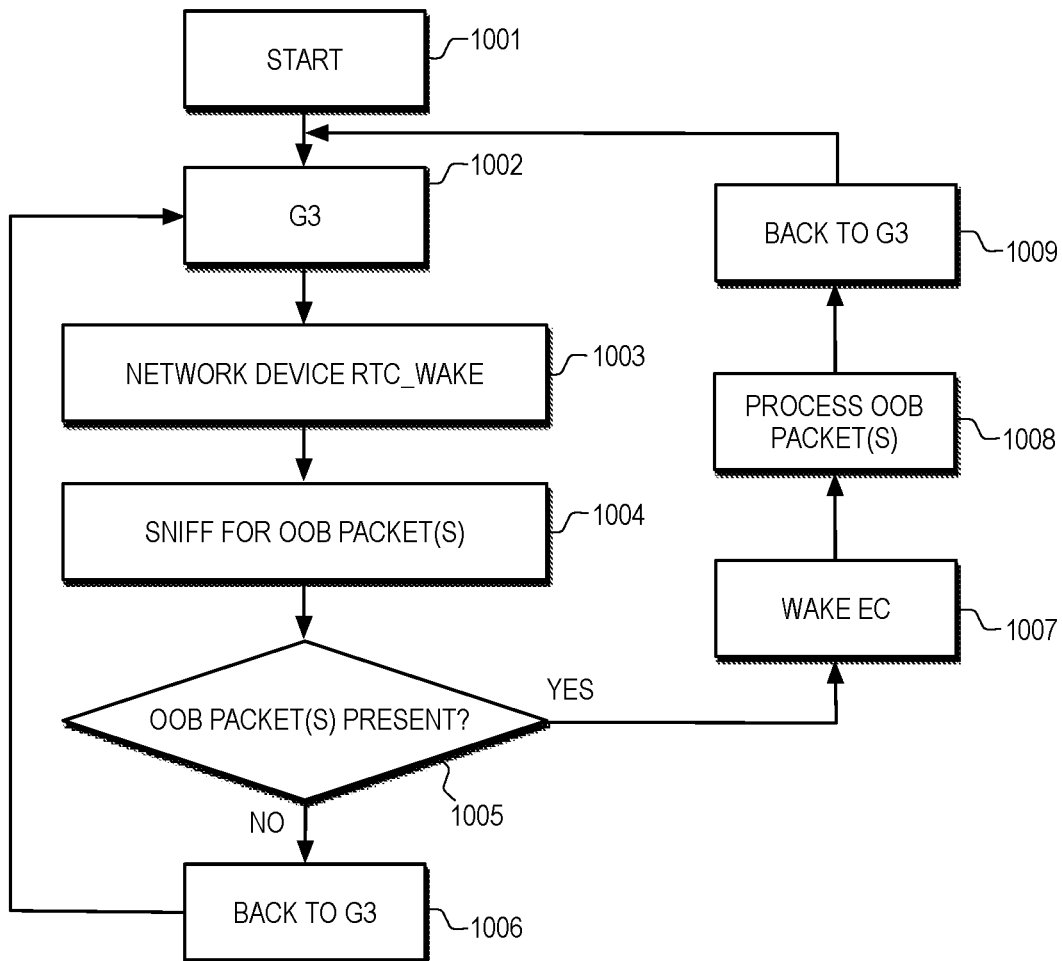
FIG. 10 is a diagram illustrating an example of a method for networking-based OOB packet sniffing from a low-power state, according to some embodiments.

FIG. 10 is a diagram illustrating an example of method 1000 for networking-based OOB packet sniffing from a low-power state. In various embodiments, method 1000 may be performed, at least in part, by network device 614 in cooperation with EC 109.

Particularly, method 1000 starts at 1001. At 1002, IHS 100 is in a low power state, such as G3, receiving power from RTC power 704. At 1003, RTC timer 901 issues a signal to RTC wake logic 902, which proceeds to switch network device 614 from RTC power 704 to 3V_ALW power 703.

At 1004, network device 614 may send and receive messages to/from cloud server(s) 617 via wired connection 615 or wireless connection 616, including sniffing for OOB manageability packets, commands, or messages, for example, by checking the status of a command buffer associated with its IHS.

At 1005, if OOB manageability packets, commands, or messages are not present, network device 614 may disconnect from 3V_ALW power 703 and connect to RTC power 704 to back to G3 state at 1006, and it may restart RTC timer 901.

Conversely, if OOB manageability packets, commands, or messages are present at 1005, network device 614 may send a VCI signal to VCI pin logic 903 to wake EC 109 out of G3 at 1007 so that EC 109 may process the received OOB manageability packets, commands, or messages at 1008. Upon processing the OOB manageability packets, commands, or messages, EC 109 may also return to G3 at 1009. After 1006 or 1009, control returns to 1002.

A yet alternative approach to architectures 700 and 900 includes configuring OOB MCU 604 to wake itself up intermittently and to check for OOB manageability packets, commands, or messages targeted for IHS 100, similar to EC 109.

Figure 11:
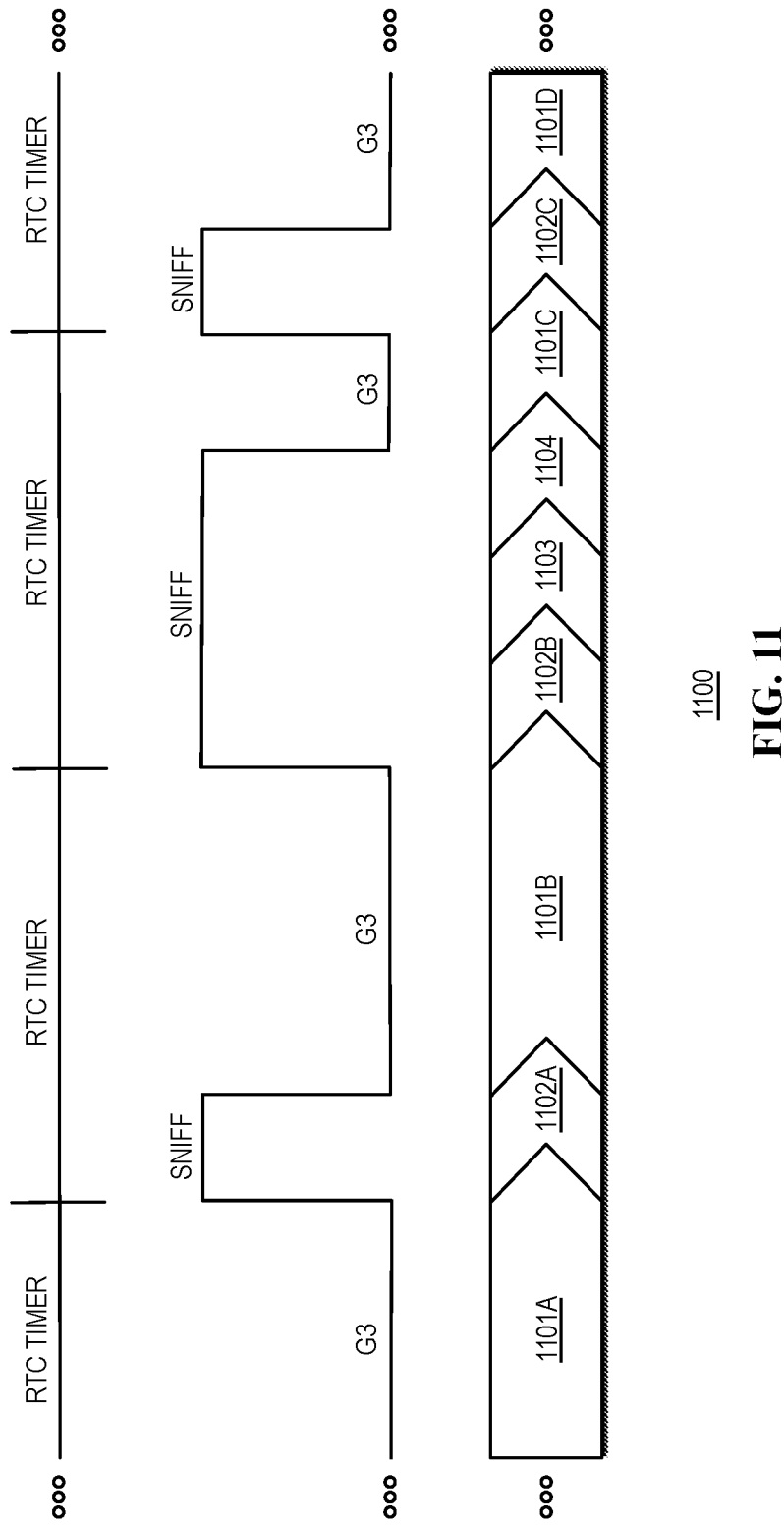
FIG. 11 is a diagram illustrating OOB packet sniffing operations, according to some embodiments.

FIG. 11 is a diagram illustrating OOB packet sniffing operations 1100. In some embodiments, operations 1100 may be performed during the execution of method 800 and/or 1000. Particularly, IHS 100 is in G3 mode at 1101A, when EC 109, OOB MCU 604, or network device 614 wake up to perform sniff operation 1102A. In this example, the result of sniff operation 1102A (e.g., 250 ms duration) is that there are no OOB manageability packets, commands, or messages buffered for IHS 100 in cloud service(s) 617; therefore EC 109, OOB MCU 604, or network device 614 return to G3 at 1101B.

EC 109, OOB MCU 604, or network device 614 again wake up to perform sniff operation 1102B at the expiration of their RTC timer 701/901 (e.g., after 5 minutes, 10 minutes, 30 minutes, etc.) In this example, the result of sniff operation 1102B is that there are OOB manageability packets, commands, or messages buffered for IHS 100 in cloud service(s) 617; for instance, EC 109 may wake up other devices within SoC 601 at 1103 (e.g., OOB MCU 604) to process the OOB manageability packets, commands, or messages at 1104. At 1101C, all components return to G3.

At a subsequent expiration of RTC timer 701/901, EC 109, OOB MCU 604, or network device 614 wake up to perform sniff operation 1102C. Again, the result of sniff operation 1102C is that there are no OOB manageability packets, commands, or messages buffered for IHS 100 in cloud service(s) 617; therefore EC 109 and/or network device 614 return to G3 at 1101D.

The time interval between sniff operations 1102A-C is selectable through configuration of RTC timer 701/901. In some cases, such an interval may allow SoC 601 to remain in G3 state 90% of the time, or any other selected amount of time.

On the cloud server(s) 617 side, systems and methods described herein may enable the caching of OOB commands targeted to any particular IHS, such that multiple managed IHS have individual queues of what operations they need to carry out. In cases of immediate commands when OOB channel is continuously up, each command queue may be emptied out instantly. When IHS 100 is in G3, however, the cloud server(s) 617 may hold queues of IHS-specific commands and it may allow each IHS coming out of that state to perform a sniff operation configured to pull any pending manageability commands targeting IHS 100.

Figure 12:
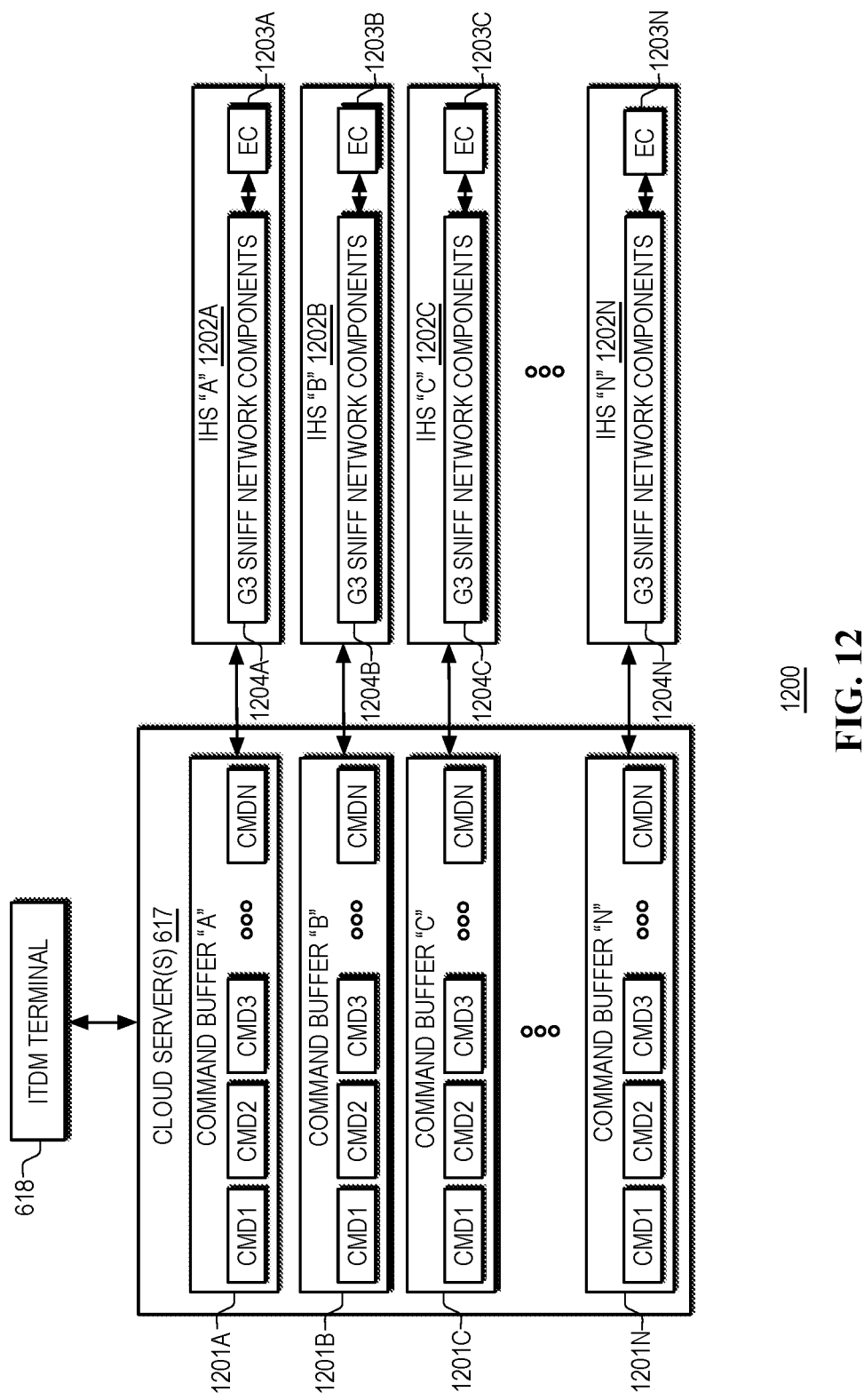
FIG. 12 is a diagram illustrating an example of a system for caching OOB manageability packets, commands, or messages, according to some embodiments.

FIG. 12 is a diagram illustrating an example of system 1200 for caching OOB manageability packets, commands, or messages. In various embodiments, system 1200 may be used to buffer OOB manageability packets, commands, or messages ("CMD1," "CMD2," etc.) addressed to a selected one of a plurality of IHSs while the IHS is in a low-power state (e.g., G3), before it performs a sniffing operation. Particularly, cloud server(s) 617 is coupled to one or more ITDM terminal(s) 618 configured to execute manageability application 619.

Cloud server(s) 617 receive OOB manageability packets, commands, or messages from ITDM terminal 618 and stores those packets, commands, or messages in appropriate ones of distinct buffers 1201A-N, each buffer associated with one of a plurality of IHSs 1202A-N. Each of IHSs 1202A-N (e.g., 100) may include its own EC 1202A-N (e.g., 109) and G3 sniff network components 1204A-N (e.g., network device 614).

Moreover, each of buffers 1201A-N may store a plurality of OOB manageability packets, commands, or messages ("CMD1" through "CMDN"). In some cases, each OOB manageability packet, command, or message in each buffer may be associated with a priority value (e.g., "0" or "1", between "1" and "5," etc.) that indicates an order in which that packet, command, or message should be retrieved by its respective IHS 1202A-N, and the packets, commands, or messages in each buffer may be sorted by priority. In other cases, each of buffers 1201A-N may provide stored OOB manageability packets, commands, or messages to its respective IHS following a first-in-first-out (FIFO) rule or technique, last-in-first-out (LIFO) rule or technique, etc.

Examples of OOB manageability packets, commands, or messages may include, but are not limited to: an IHS provisioning command, a locate IHS command, put the IHS in a selected power mode, restrict access to the IHS, entitlements, firmware updates, change BIOS settings, system or device inventory collection command, collect telemetry data, a kill pill, etc.

Figure 13:
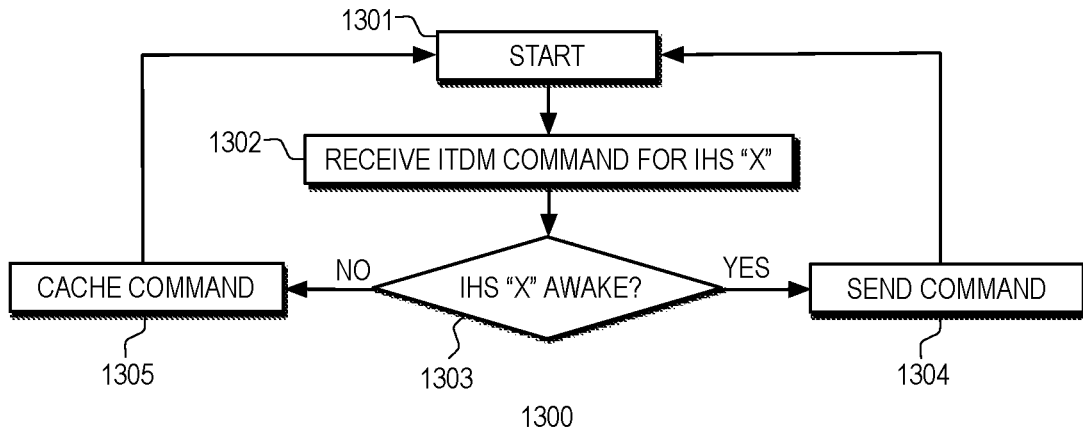
FIG. 13 is a diagram illustrating an example of a method for caching OOB manageability packets, commands, or messages, according to some embodiments.

FIG. 13 is a diagram illustrating an example of method 1300 for caching OOB manageability packets, commands, or messages. In some embodiments, method 1300 may be performed by cloud server(s) 617 in cooperation with IHSs 1202A-N. Particularly, method 1300 starts at 1301. At 1302, cloud server(s) 617 may receive an OOB manageability packet, command, or message from ITDM terminal 618 targeting a selected one of IHSs 1202A-N (e.g., IHS "X"). At 1303, cloud server(s) 617 determines whether IHS "X" is awake (e.g., by sending a message and waiting for an acknowledgement).

At 1303, if cloud server(s) 617 determines that IHS "X" is awake (e.g., the acknowledgement is received), then at 1304 it transmits the OOB manageability packet, command, or message to IHS "X." In some cases, if IHS "X" is determined to be awake (e.g., S0), cloud server(s) 617 may send a message to IHS "X" to prevent it from entering a sleep state until its OOB manageability packets, commands, or messages have been processed.

Conversely, at 1303, if cloud server(s) 617 determines that IHS "X" is not awake (e.g., the acknowledgement is not received), then at 1305 it stores the OOB manageability packet, command, or message in a buffer 1201A-N associated with IHS "X." When IHS "X" partially wakes up to perform a G3 Sniff operation, it may follow methods 800 and/or 1000 to retrieve its queued OOB manageability packets, commands, or messages. After executing or processing all of its packets, commands, or messages, all components of IHS "X" may return to the G3 state.

In that regard, the inventors hereof also have recognized that, when OOB packets are sent to a target IHS, there is a need to allow a separation between: (a) "normal," "standard," or "baseline" OOB packets, which contain management commands and features that a maker of SoC 601 may choose to enable for all IHS manufacturers (e.g., Original Equipment Manufacturer or "OEM") without discrimination; and (b) "enhanced," "special," or "opaque" OOB packets, which contain management commands and features that are proprietary or otherwise specific to a given IHS OEM, in order to allow the OEM to provide differentiating features to its customers.

To address these, and other concerns, systems and methods described herein may enable distinguishing baseline OOB packets from opaque OOB packets, such that the processing of baseline OOB packets may be covered by a publicly available specification. Conversely, opaque OOB packets may be processed by OEM-owned firmware without the maker of SoC 601 having any knowledge of at least a portion of its contents (e.g., the payload portion of the opaque OOB packet). In some embodiments, OEM-owned firmware may reside primary within an EC 109's domain, or in a protected customizable space (an isolated execution area or "sandbox") within OOB MCU 604.

Figure 14:
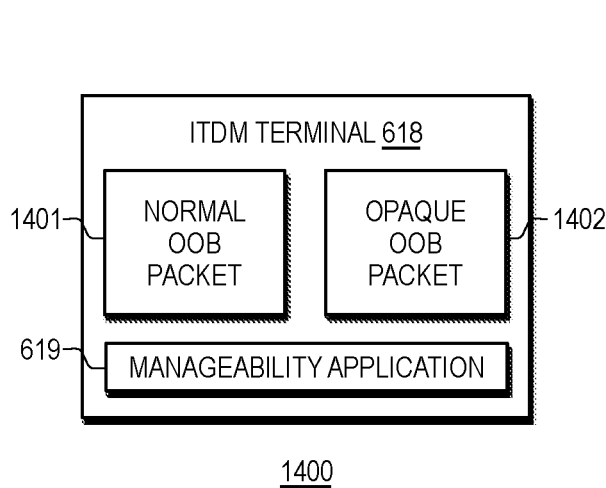
FIG. 14 is a diagram illustrating an example of an Information Technology Decision Maker (ITDM) terminal with baseline and opaque OOB packets, according to some embodiments.

FIG. 14 is a diagram illustrating example 1400 of ITDM terminal 618 with baseline OOB packets 1401 and opaque OOB packets 1402 handled by manageability application 619. As such, example 1400 spits OOB traffic into separate two categories or types: a "baseline" type for public domain functionality available to all OEMs; and an "opaque" type for OEM-differentiated or special capabilities beyond the baseline-which may be treated as "opaque data" whereby the OOB infrastructure simply passes the packets through to OEM-owned firmware stacks.

In other embodiments, three or more categories or types of OOB commands or packets 1402 may be used. For example, in addition to a baseline category for all OEMs, ITDM terminal 618 may enable the creation of two or more opaque packet categories: a first category or sub-type of opaque OOB packets for a specific OEM that relates to free services or features provided by that OEM, and a second category or sub-type of opaque OOB packets for the same OEM that relates to paid or premium features provided by that OEM.

In some embodiments, different types of opaque OOB packets 1402 may be associated with a specific map, key, or decode ring that structurally indicates, bit-by-bit and/or field-by-field, what variable or setting each bit value in the opaque OOB packet is mapped to (that is, what the value means) for a given OEM. Moreover, the map, key, or decode ring necessary for interpreting opaque OOB packet 1402 may not be shared with the maker of SoC 601 (except, in some cases, for the header portion of opaque packet 1402). Instead, such map, key, or decode ring may reside only within the OEM firmware (e.g., EC 109), so that to any entity other than EC 109, opaque OOB packet 1402 may remain undecipherable.

Figure 15:
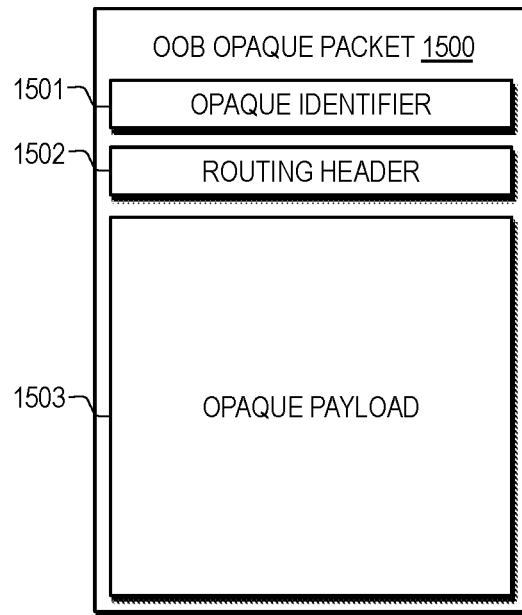
FIG. 15 is a diagram illustrating an example of an opaque OOB packet, according to some embodiments.

FIG. 15 is a diagram illustrating an example of opaque OOB packet 1500. In some embodiments, opaque packet 1500 may include opaque identifier 1501, opaque routing header 1502, and opaque payload 1503. For example, opaque identifier 1501 may indicate whether packet 1500 is a baseline packet or an opaque packet (or a sub-type of opaque packet). Meanwhile, opaque routing header 1502 may indicate a target device, within a particular IHS (e.g., EC 109, BIOS/UEFI 107, OOB MCU 604, host OS 300, any device within SoC 601, etc.) for processing opaque OOB packet 1500.

Figure 16:
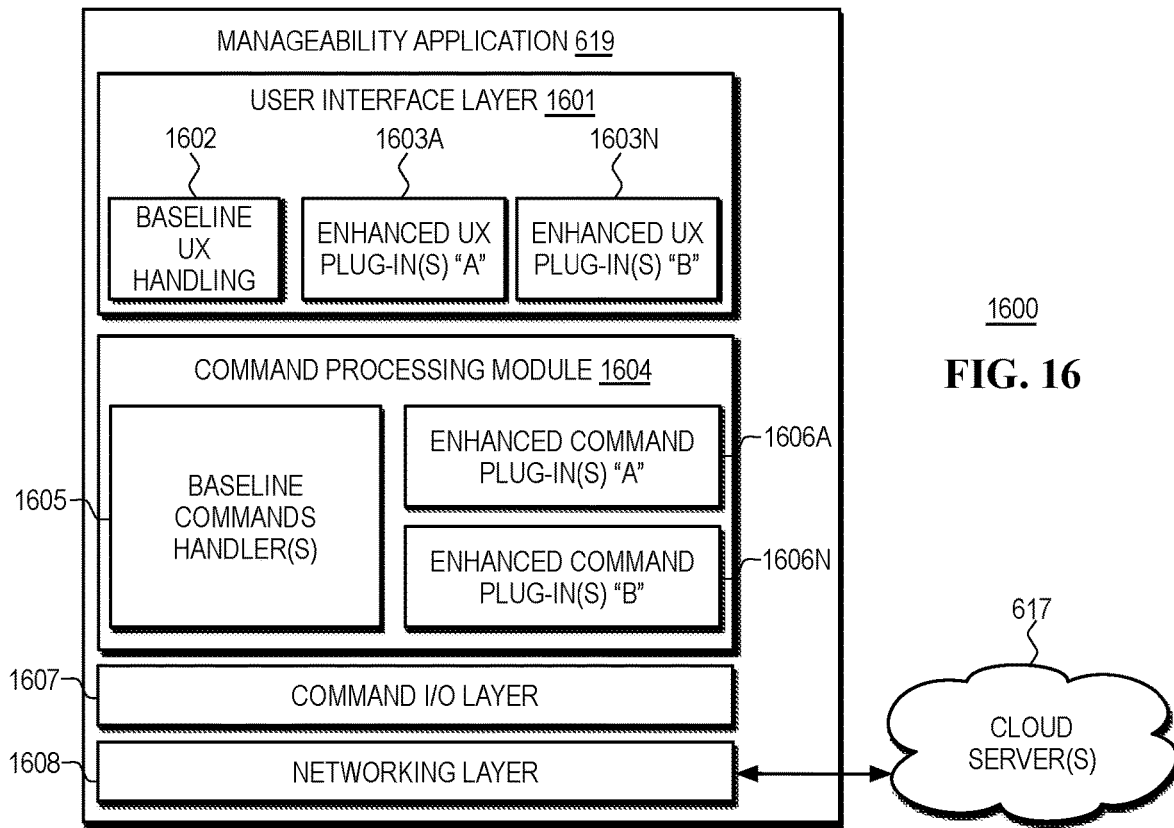
FIG. 16 is a diagram illustrating an example of a manageability application, according to some embodiments.

FIG. 16 is a diagram illustrating an example of manageability application 619. In various embodiments, manageability application 619 may include User Interface (UX) layer 1601 having baseline UX handling plugin 1602 and enhanced UX plug-ins 1603A-N. Command processing module 1604 includes baseline command handler(s) 1605 and enhanced command plugin(s) 1606A-N. Manageability application 619 also includes command I/O layer 1607 and networking layer 1608, such that the latter is in communication with cloud server(s) 617.

In operation, an ITDM may access or execute manageability application 619, for example, using ITDM terminal 618 coupled to cloud server(s) 617. The ITDM may use baseline UX handling module 1602 or one of plugins 1603A-N to enter one or more OOB management commands targeting a selected one of plurality of IHSs and/or a selected device or endpoint within the selected IHS. If the OOB management command is a baseline OOB command, module 1602 is invoked. Conversely, if the OOB management command is an opaque, OEM-specific command, it may be entered through one of plugins 1603A-N (e.g., one plugin for each OEM, one plugin per type of opaque command, etc.).

Once the OOB management command is received by user interface layer 1601, it is passed to one of handlers 1605 or 1606A-N within command processing module 1604. In some cases, each of modules 1605 is associated with a corresponding one of plugin 1603A-N.

Each of handlers 1605 or 1606A-N may be configured to take an OOB management command from a corresponding one of module 1602 or plugins 1603A-N and to produce one or more baseline or opaque OOB packets containing the OOB management command, for example, using a unique packet map, key, or decode ring.

Baseline OOB packets may have a packet map, key, or decode ring that is known, whereas opaque OOB packets may have packet maps, keys, or decode rings that are secret and known only to the OEM. Moreover, when a new OEM and/or opaque packet type is added, a respective plugin 1603A-N and corresponding handler 1606A-N may also be added to manageability application 619.

Handlers 1605 or 1606A-N pass the OOB packets to command I/O layer 1607. Command I/O layer 1607 forwards the OOB packets to networking layer 1608, from where the OOB packets are sent to cloud server(s) 617 and then forwarded to a respective IHS, as identified in the packet header (e.g., opaque header 1502), if the IHS is running. If the IHS is in a low-power mode (e.g., G3), however, cloud server(s) 617 may queue the OOB packet in an associated one of command buffers 1201A-N.

Figure 17:
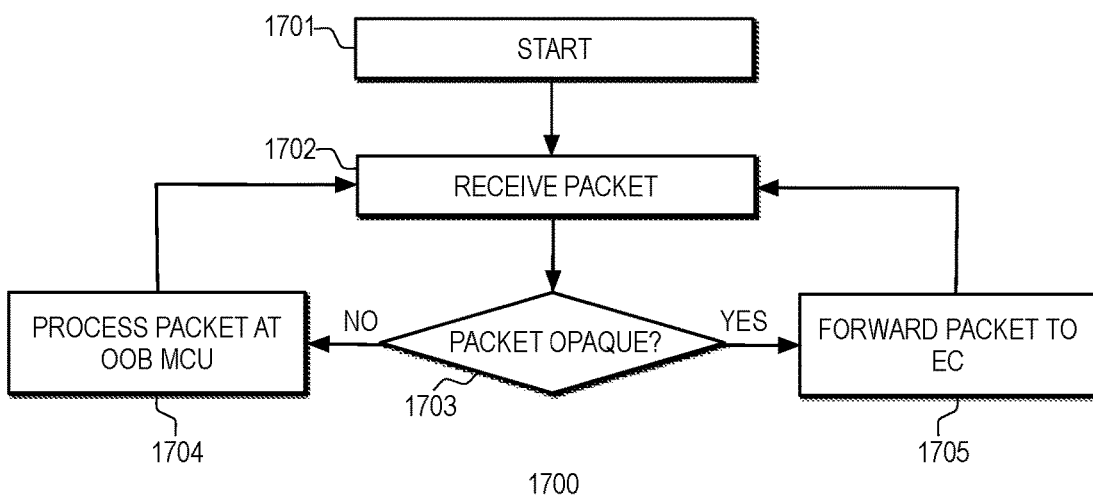
FIG. 17 is a diagram illustrating an example of a method for handling normal and opaque OOB packets, according to some embodiments.

FIG. 17 is a diagram illustrating an example of method 1700 for handling normal and opaque OOB packets. In some embodiments, method 1700 may be performed, at least in part, by OOB MCU 604. Particularly, method 1700 starts at 1701.

At 1702, OOB MCU 604 may receive an OOB packet (from network device 614) and it may inspect the OOB packet's opaque identifier 1501, if any. If the OOB packet is not opaque, it may be processed by OOB MCU 604. Conversely, if at 1702 method 1700 determines that the OOB packet is opaque, OOB MCU 604 may forward the OOB packet to EC 109. After 1704 or 1705, control returns to 1702.

In this example, EC 109 includes an opaque packet map, key, or decode ring for decoding or interpreting the opaque packet, and the EC's firmware under control of the IHS's OEM is the only entity with such a map, key, or decode ring. In other cases, however, OOB MCU 604 may include a sandbox portion (described below) configured to process opaque packets on behalf of the OEM without access by the manufacturer, maker, vendor, or supplier of SoC 601, such that the sandbox portion of OOB MCU 614 includes the opaque packet map, key, or decode ring. The sandbox may constitute a separate or isolated execution area not visible to the SoC 601's vendor.

Additionally, or alternatively, method 1700 may be performed by network device 614, in which case network device 614 includes the opaque packet map, key, or decode ring.

When EC 109 (or any other endpoint) needs to respond to the OOB management command included in an inbound opaque OOB packet, EC 109 may send such a response message using the same opaque map, key, or decoder ring as the inbound OOB packet. The outbound response message may be at least partially undecipherable by OOB MCU 604 or any entity other than an OEM server configured to receive such a message. As such, the response message may leave EC 109 and reach network device 614 through OOB MCU 604 without its payload being decipherable.

Although described as being performed by OOB MCU 604, in some cases method 1700 may instead be performed by network device 614. For example, if SoC 601 is in G3 state, it may be more efficient to have network device 614 inspect the opaque OOB packet and, if it is intended to be executed by EC 109, forward the opaque OOB packet to EC 109 without waking OOB MCU 604 up from G3.

More generally, when OOB packets are sent to an IHS in the opaque data format, if all of them were routed only to EC 109, many use cases would not be fully optimized because certain OOB management commands are performed by other entities (e.g., host processor(s) 602), and therefore require additional data transfers from EC 109 to those entities.

To address these, and other concerns, routing header 1502 of OOB packet 1500 may indicate a target or destination endpoint within SoC 601 of IHS 100, such as, for example: EC 109, BIOS/UEFI 107 (as executed by host processor(s) 602), and OOB MCU 604. OOB management operations that are best handled by EC 109 (and which are OEM-differentiated features would use the opaque data model and EC 109 as the target endpoint for the opaque data packet. OOB MCU 604 may ensure the data path chosen is the hardware link to EC 109 through a pre-established communications link between OOB MCU 604 and EC 109.

Similarly, OOB management commands that are best handled by the BIOS may be routed directly to the BIOS/UEFI 107 when host processor(s) 602 is up and running. OOB MCU 604 may use SoC data paths to send the packet to BIOS/UEFI 107 when BIOS/UEFI 107 is noted as the endpoint in routing header 1502. Alternately if BIOS/UEFI 107 is not up and running, OOB MCU 604 may queue the OOB packet for later delivery, when BIOS/UEFI 107 may send a flag to OOB MCU 604 that BIOS/UEFI 107 is up and running. Finally, OOB management commands that are best handled by OOB MCU 604 itself, yet within the Dell proprietary context, may be routed to a sandbox or an OEM FW stack handler within OOB MCU 604, as described in more detail below.

Figure 18:
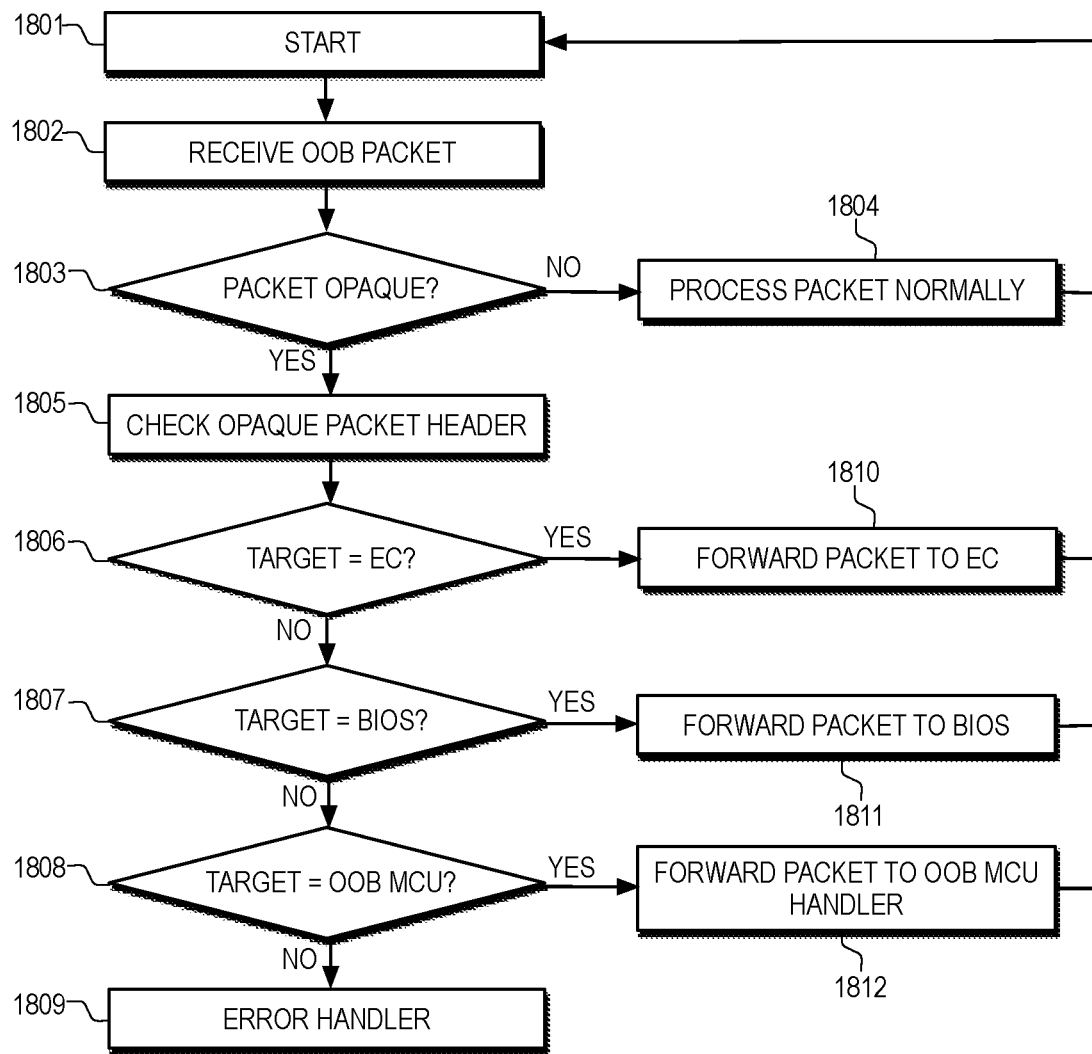
FIG. 18 is a diagram illustrating an example of a method for routing opaque OOB packets, according to some embodiments.

FIG. 18 is a diagram illustrating an example of method 1800 for routing opaque OOB packets. In some embodiments, method 1800 may be performed, at least in part, by OOB MCU 604. Particularly, method 1800 begins at 1801.

At 1802, OOB MCU 604 may receive an OOB packet (e.g., from network device 614). At 803, OOB MCU 604 determines whether the OOB packet is baseline or opaque. If the OOB packet is a baseline packet, OOB MCU 604 processes the packet and executes the OOB management command contained therein at 1804. Conversely, if the OOB packet is an opaque packet, as indicated in identifier 1501, at 1805 method 1800 may check the contents of packet header 1502.

At 1806, if OOB MCU 604 determines that the OOB packet's target is EC 109, at 1810 OOB MCU 604 may forward the packet to EC 109 (e.g., via low-bandwidth bus controller 611). At 1807, if OOB MCU 604 determines that the OOB packet's target is BIOS/UEFI 107, at 1811 OOB MCU 604 may forward the packet to BIOS/UEFI 107 (e.g., via host processor(s) 602). At 1808, if OOB MCU 604 determines that the OOB packet's target is OOB MCU 604, at 1812 OOB MCU 604 may process the OOB packet using the OEM's "sandbox," as described below. Otherwise at 1809 method 1800 may invoke an error handling process.

Although three OOB packet targets or destinations are specifically shown in method 1800, in alternative embodiments any number of targets (e.g., host OS 300, other devices within SoC 601, etc.) may be specified in opaque header 1502. Moreover, although method 1800 is shown as being performed by OOB MCU 604, in other cases these routing operations may be performed by EC 109 and/or network device 614.

When an opaque OOB packet reaches OOB MCU 604, OOB MCU 604 may need to separate: (a) a standard OOB MCU firmware, from (b) an OEM custom firmware, in order to handle the opaque OOB packets separately from baseline OOB packets, so as not to compromise enhanced or exclusive manageability features added by the IHS's OEM.

To address these, and other issues, systems and methods described herein may add a "sandbox" section to OOB MCU 604 such that OEM-specific firmware can have access to the hardware capabilities of OOB MCU 604. The manufacturer or vendor of SoC 601 may provide a baseline API to their existing OOB MCU 604 capabilities and hardware peripherals, and an OEM can write any features or commands necessary for implementing its differentiating features (e.g., handling opaque packets routed to OOB MCU 604) without disclosing those features to third parties.

Figure 19:
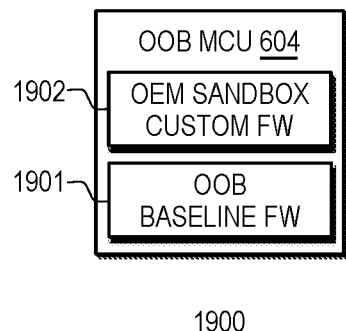
FIG. 19 is a diagram illustrating an example of a system for handling opaque OOB packets in a sandbox, according to some embodiments.

FIG. 19 is a diagram illustrating an example of system 1900 for handling opaque OOB packets in a sandbox. As shown, OOB MCU 604 may execute OOB baseline firmware 1901 and OEM sandbox custom firmware 1902 separately from each other.

In some implementations, once OOB MCU 604 executes OOB baseline firmware 1901, it may instantiate a main RTOS that accepts OEM sandbox custom firmware 1902 to operate as a segregated RTOS module. In other implementations, however, OEM sandbox custom firmware 1902 may be executed in other suitable ways such that it may have access to all resources and APIs that the manufacturer or vendor of SoC 601 provides as part of its baseline operations.

As such, in some cases, OOB baseline firmware 1901 may be used to process baseline OOB commands or packets. Conversely, OEM sandbox custom firmware 1902 may be used to process opaque OOB commands or packets to the exclusion of OOB baseline firmware 1901.

To execute different firmware separately, OOB MCU 604 may include "Secure World" and "Normal World" operating modes of architectures, such as ARM-based TRUSTZONE extensions. It should be understood, however, that OOB MCU 604 described herein is operable with any other security architectures or trust execution environments including, but not limited to Open Multimedia Applications Platform (OMAP)-based architectures, M-Shield-based architectures, x86 system management mode (SMM), etc.

For example, OOB MCU 604 may use TRUSTZONE extensions to enable execution isolation for ensuring code and data integrity and confidentiality and the isolation of operations (and storage) from access by the "Normal World" via a firmware-based processor. In other words, OEM sandbox custom firmware 1902 is read from system firmware (or other source) and placed into protected memory and uses TRUSTZONE extensions and security primitives to provide secure execution isolation within a firmware-based sandbox that can be implemented within ARM-based architectures.

Although one OEM-specific sandbox 1902 is specifically shown in system 1900, in alternative embodiments any number of such sandboxes may be provided in OOB MCU 604, each sandbox its own execution area separate and distinct from all other sandboxes.

Figure 20:
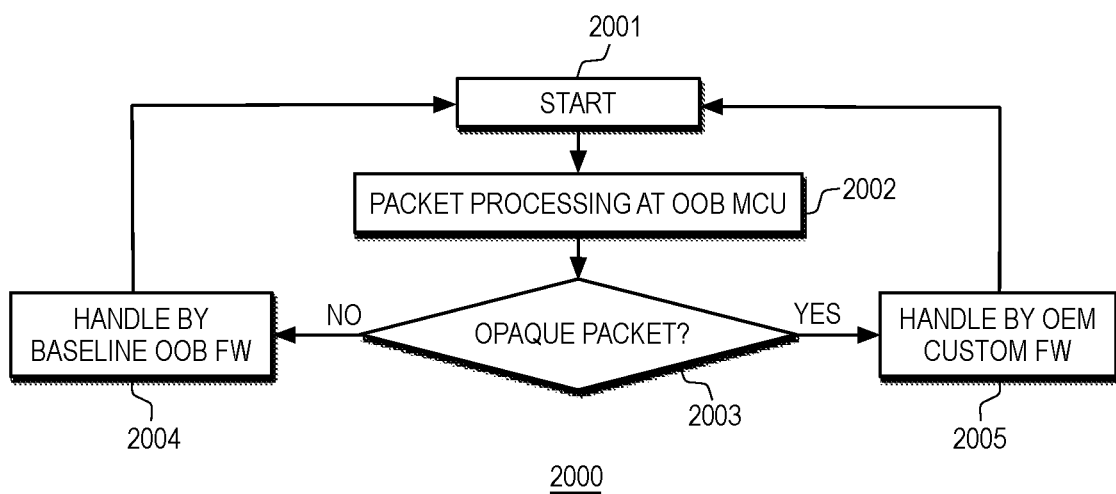
FIG. 20 is a diagram illustrating an example of a method for handling opaque OOB packets in a sandbox, according to some embodiments.

FIG. 20 is a diagram illustrating an example of method 2000 for handling opaque OOB packets in a sandbox. In some embodiments, method 200 may be performed, at least in part, by OOB MCU 604.

Particularly, method 2000 begins at 2001. At 2002, OOB MCU 604 starts processing OOB packets, for example, received by network device 614 during a G3-sniff operation. At 2003, OOB MCU 604 determines whether an OOB packet to be processed is opaque.

At 2003, if the OOB packet is not opaque (e.g., baseline), at 2004 OOB MCU 604 may handle (e.g., decode, route, and/or execute) the OOB packet using OOB baseline firmware 1901. Conversely, if at 2003 the OOB packet is opaque, at 2005 OOB MCU 604 may handle the OOB packet using OEM sandbox custom firmware 1902, in a segregated execution environment.

Figure 21:
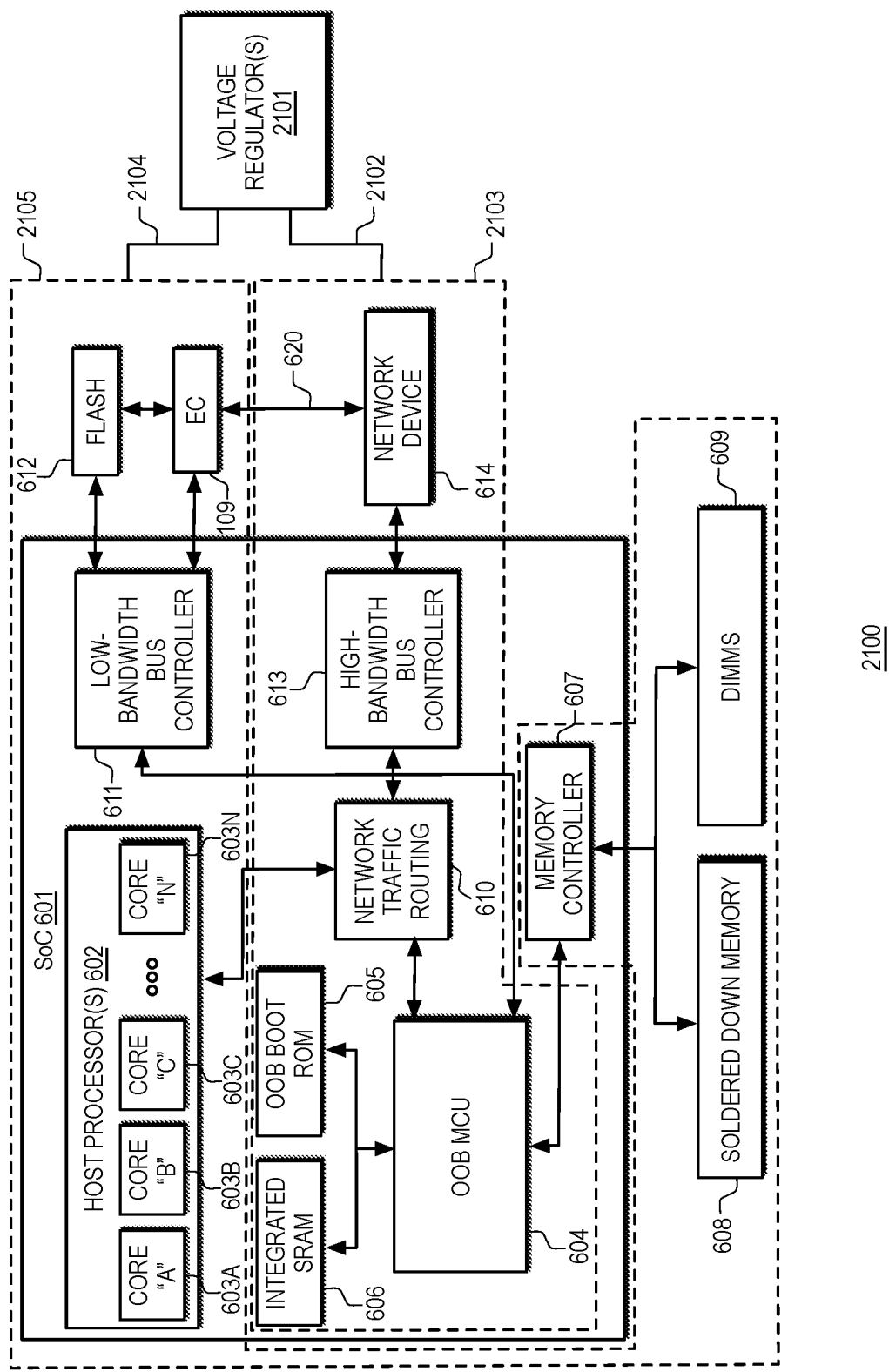
FIG. 21 is a diagram illustrating an example of a power domain architecture for a heterogenous computing platform configured to perform OOB packet sniffing operations, according to some embodiments.

In various embodiments, systems and methods described herein may provide a power domain and/or rail architectures that enable power management in SoC 601. For example, FIG. 21 is a diagram illustrating an example of power domain architecture 2100 for a heterogenous computing platform configured to perform OOB packet sniffing operations.

As shown, power domain architecture 2100 may include first power domain 2103 comprising a first set of one or more SoC devices, such that first power domain 2103 is configured to receive a first voltage supply 2102 during an OOB packet sniffing operation while a second set of one or more devices integrated into SoC 601 remains in a low-power state. Power domain architecture 2100 may also include second power domain 2105 comprising the second set of one or more SoC devices. Second power domain 2105 may be configured to receive second voltage supply 2104.

Each of power domains 2103 and 2105 has its own voltage supply rail 2102 and 2104 provided by voltage regulator(s) 2101, respectively. Particularly, within SoC 601, first voltage supply rail 2102 powers OOB MCU 604, OOB boot ROM 605, integrated SRAM 606, network traffic routing controller 610, and high-bandwidth bus controller 613. Outside of SoC 601, first voltage supply rail 2102 also powers network device 614.

Meanwhile, within SoC 601, second voltage supply rail 2105 powers host processor(s) 602, low-bandwidth bus controller 611, and memory controller 607. Outside of SoC 601, second voltage supply rail 2105 also powers soldered down memory 608, DIMMs 609, flash memory 612, and EC 109.

In various implementations, second voltage supply rail 2105 may be capable of providing more power than first voltage supply rail 2103. For example, first voltage supply rail 2103 may be configured to supply enough power for network device 614 and OOB MCU 604 to perform G3 Sniff operations (and other operations associated with sniffing), whereas second voltage supply rail 2105 may be configured to supply runtime power sufficient for host processor(s) 602 to execute BIOS/UEFI 107, load host OS 300, etc.

In some cases, second power domain 2105 may be configured to receive second voltage supply 2104 under control of network device 614. For example, network device 614 may include a GPIO pin or the like that controls the status of a power control FET or switch to couple or decouple second voltage rail 2104 from second power domain 2105. Additionally, or alternatively, first voltage supply rail 2102 may be turned on without second voltage supply rail 2104; but second voltage supply rail 2104 cannot be turned on without first voltage supply rail 2102 also being on.

In some embodiments, systems and methods described herein may provide progressive power level changes (at system level) so simple OOB packets or commands that can be processed and/or executed efficiently, without waking up unnecessary devices. For example, OOB packets or commands requiring only OOB MCU 604 may not need to wake EC 109. Similarly, OOB packets or commands requiring only EC 109 may not need to wake up BIOS/UEFI 107 (e.g., EC telemetry for hardware diagnostics). OOB packets or commands requiring BIOS/UEFI 107 may cause SoC 601 to enter its highest power state and bring up all power rails necessary for the host processor(s) 602 to run UEFI.

Figure 22:
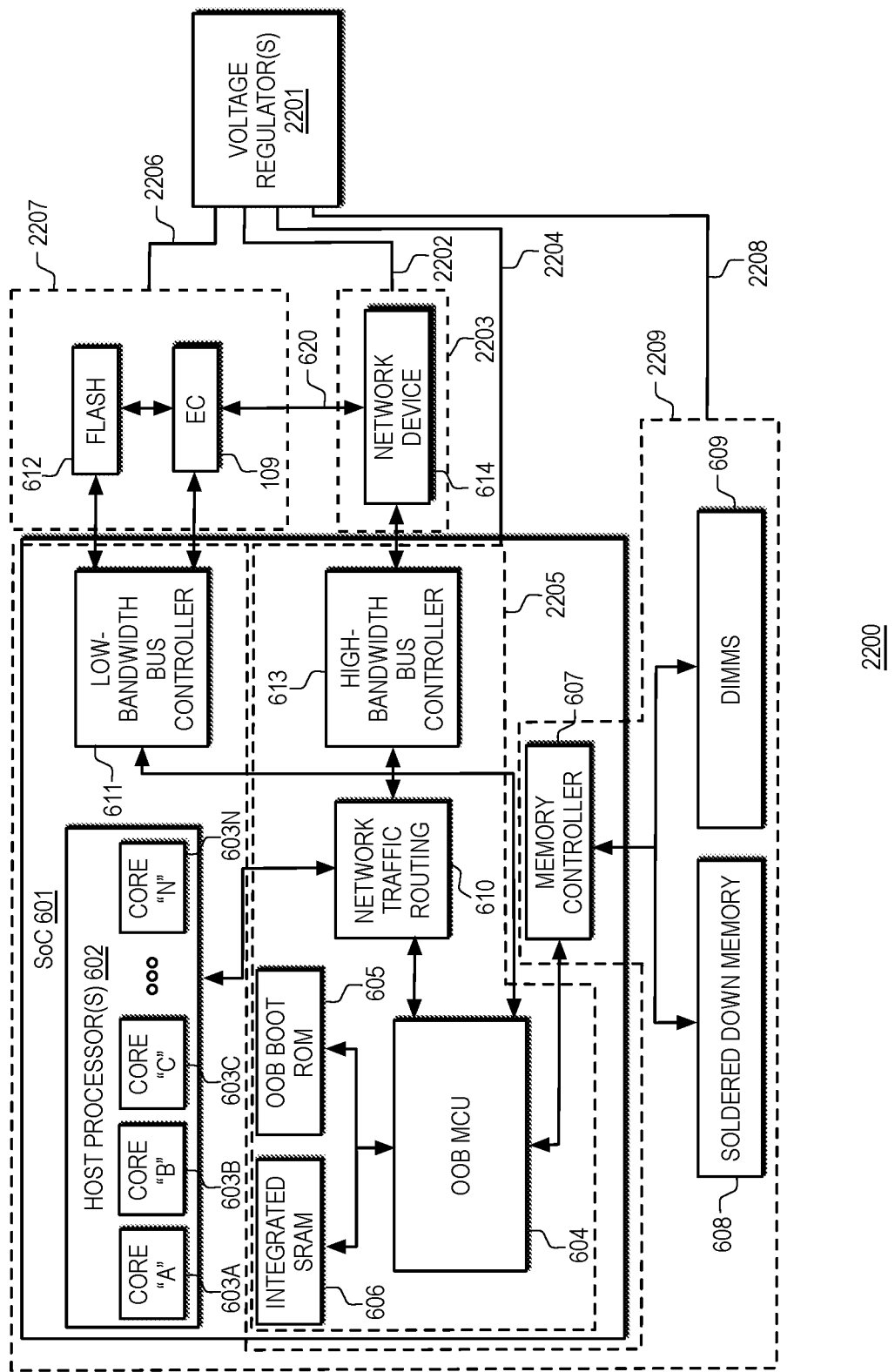
FIG. 22 is a diagram illustrating an example of a system for progressive power control in a heterogenous computing platform, according to some embodiments.

In that regard, FIG. 22 is a diagram illustrating an example of system 2200 for progressive power control in a heterogenous computing platform. In this case, SoC 601 comprises: network device 614 disposed in first power domain 2203 configured to receive power from first voltage supply rail 2202 from voltage regulator 2201, OOB MCU 604 disposed in second power domain 2205 configured to receive power from second voltage supply rail 2204 from voltage regulator 2201, EC 109 disposed in third power domain 2207 configured to receive power from first voltage supply rail 2206 from voltage regulator 2201, and host processor(s) 602 disposed in fourth power domain 2209 configured to receive power from fourth voltage supply rail 2208 from voltage regulator 2201.

In operation, network device 614 examines an OOB packet and powers second power domain 2205 before it routes the OOB packet to OOB MCU 604. If OOB MCU 604 determines that the OOB packet is opaque, it powers third power domain 2207 and sends the opaque OOB packet to EC 109. If EC 109 decodes the opaque OOB packet with an OEM's map, key, or decode ring and interprets an OOB management command to be performed by BIOS/UEFI 107 (e.g., change BIOS settings), it powers fourth power domain 2209.

In some implementations, network device 614 may include a GPIO pin or the like that controls the status of a power control FET or switch to couple or decouple second voltage rail 2104 from second power domain 2105. OOB MCU 604 may include a GPIO pin or the like that controls the status of another power control FET or switch to couple or decouple third voltage rail 2106 from third power domain 2107. Furthermore, EC 109 may include a GPIO pin or the like that controls the status of yet another power control FET or switch to couple or decouple fourth voltage rail 2108 from fourth power domain 2108.

Figure 23:
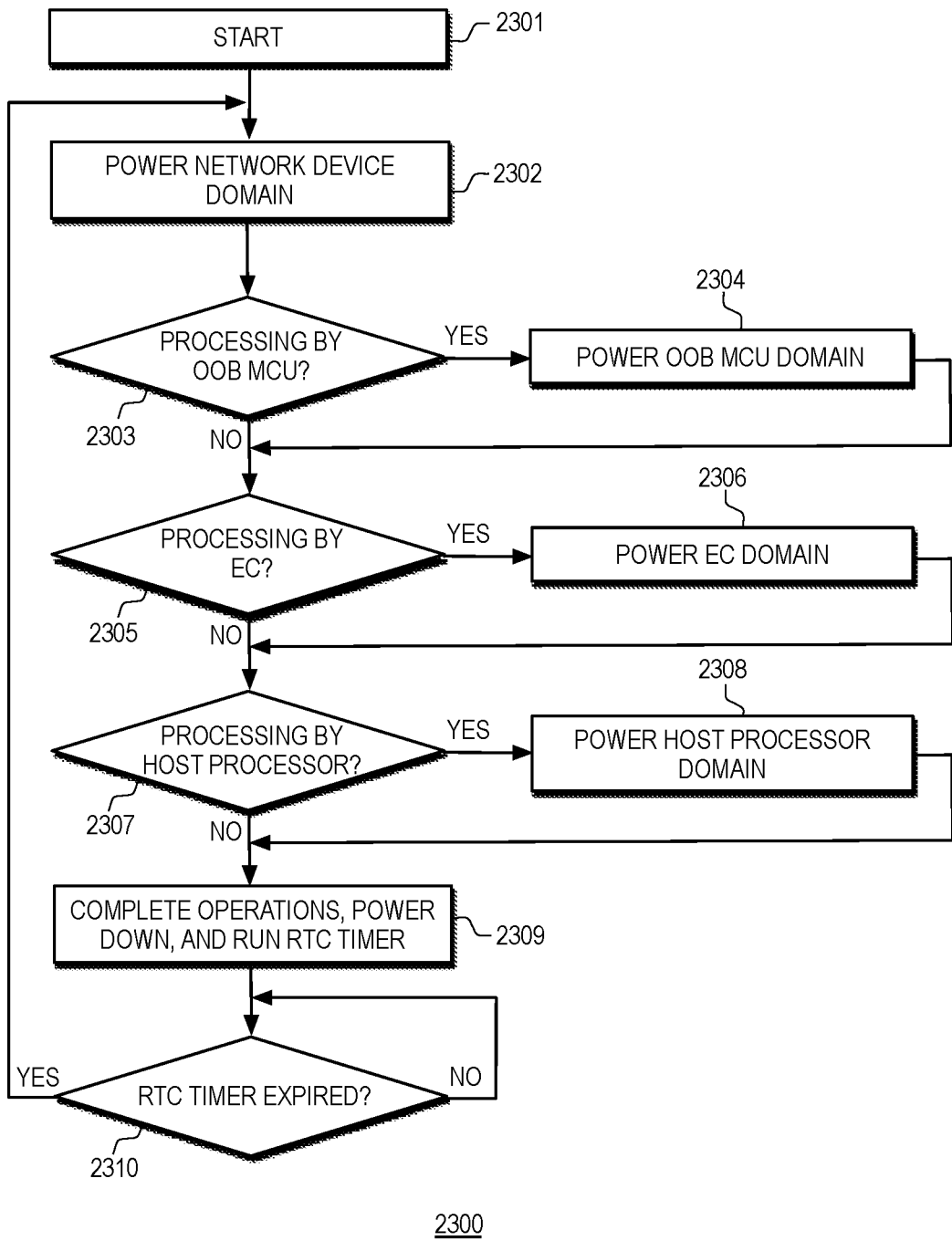
FIG. 23 is a diagram illustrating an example of a method for progressive power control in a heterogenous computing platform, according to some embodiments.

FIG. 23 is a diagram illustrating an example of method 2300 for progressive power control in a heterogenous computing platform. In various embodiments, devices within SoC 601 may be powered up sequentially, depending upon what needs to be done next. For example, network device 614 may be configured bring up EC 109 or OOB MCU 604, but not host processor(s) 602.

Particularly, method 2300 starts at 2301. At 2302, method 2300 may power up first power domain 2202 comprising network device 614 (e.g., upon expiration of RTC timer 901). (while second, third, and fourth power domains 2205, 2207, and 2209 remain in G3).

At 2303, method 2300 may determine whether an OOB packet or command retrieved by network device 614 as the result of a G3 Sniff operation is to be processed by OOB MCU 604. If so, at 2304 network device 614 may power up second power domain 2205 and send the OOB packet or command to OOB MCU 604 (while third and fourth power domains 2207 and 2209 remain in G3).

At 2305, method 2300 may determine whether the OOB packet or command processed by OOB MCU 604 is to be further processed by EC 109. If so, at 2306 OOB MCU 604 may power up third power domain 2207 and send the OOB packet or command to EC 109 (while fourth power domain 2209 remains in G3).

At 2307, method 2300 may determine whether the OOB packet or command processed by EC 109 is to be further processed by host processor(s) 602. If so, at 2308 OOB MCU 604 may power up fourth power domain 2209 and send the OOB packet or command to host processor(s) 602.

At 2309, method 2300 completes the OOB management operations triggered by the OOB packet or command, powers all power domains down (e.g., to G3), and runs RTC timer 901. At 2310, upon expiration of RTC timer 901, control returns to 2302.

In some cases, operations 2305 and 2306 may be switched with operations 2303 and 2304, depending upon which device is supposed to decode the OOB packet or execute an OOB command. For example, based upon destination endpoint information (e.g., identifying OOB MCU 604 or EC 109) contained in an opaque OOB packet header, the EC domain (third power domain 2207) may be powered up before the OOB MCU domain (second power domain 2207).

In some embodiments, systems and methods described herein may provide an interconnect architecture suitable for OOB manageability in SoC 601. Using these systems and methods, OOB MCU 604 may access other integrated devices through SoC 601's internal interconnect fabric (e.g., interconnect 203 in FIG. 2.) while host processor(s) 602 remains in a low-power state (e.g., G3). In some cases, the SoC 601's interconnect architecture may provide OOB MCU 604 with access to all PCIe devices, storage, video, etc.

Figure 24:
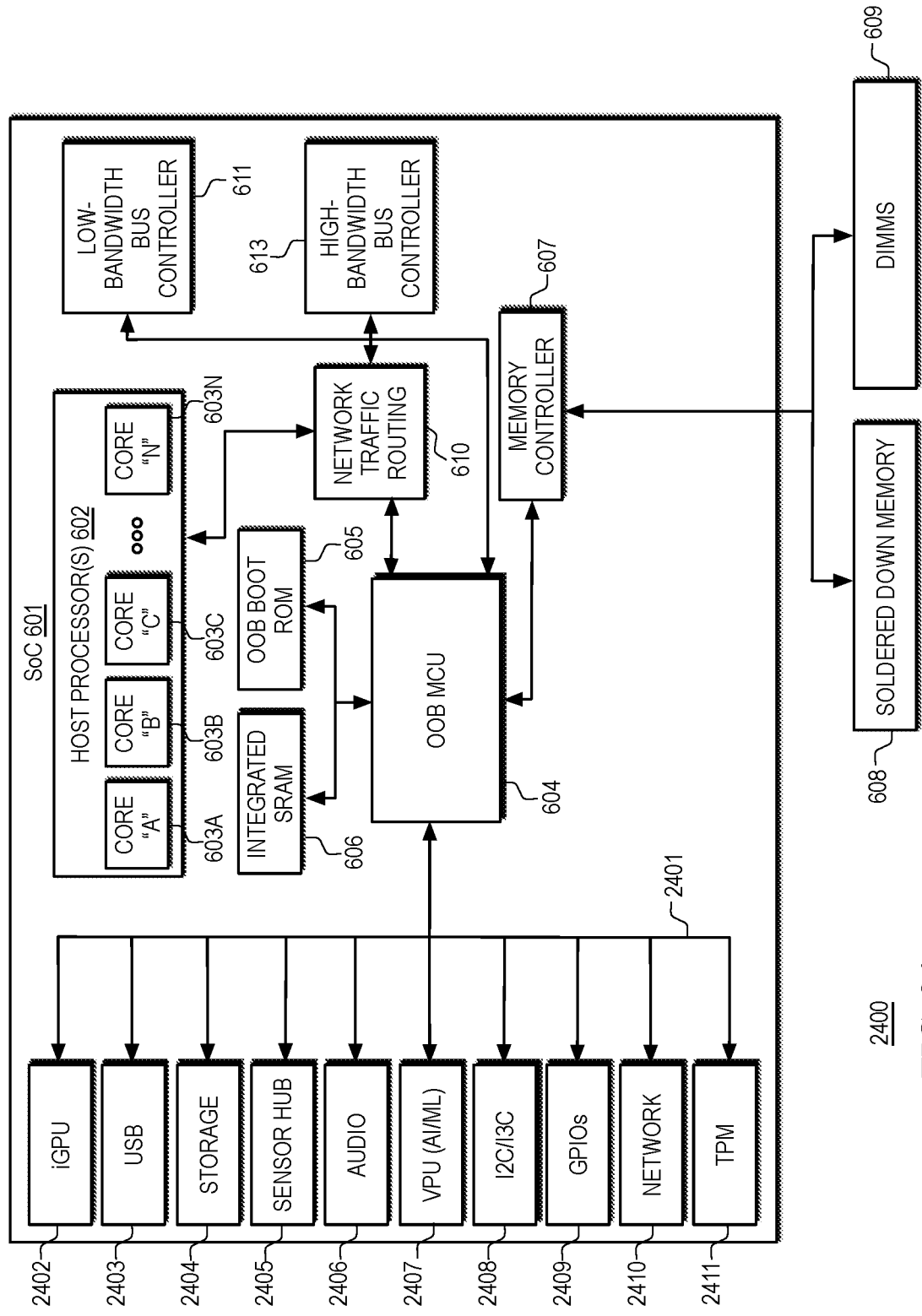
FIG. 24 is a diagram illustrating an example of an interconnect architecture suitable for OOB manageability in a heterogenous computing platform, according to some embodiments.

FIG. 24 is a diagram illustrating an example of interconnect architecture 2400 suitable for OOB manageability in a heterogenous computing platform. In this case, OOB MCU 604 is coupled to a plurality of devices 2402-2411 integrated into SoC 601 via internal interconnect 2401 (e.g., 203).

Specifically, OOB MCU 604 is coupled via interconnect 2401 to integrated GPU (iGPU) 2402 (e.g., 204), USB controller 2403 (e.g., 214), storage device or Serial AT Attachment (SATA)/Nonvolatile Memory Express (NVMe) controller 2404, sensor hub 2405 (e.g., 207), audio controller 2406 (e.g., 206), VPU 2407 (e.g., 211), I²C/I³C controller 2408, GPIO controller 2409, network controller 2410 (e.g., 213), and TPM 2411 (e.g., 212).

It should be noted that devices 2402-2411 are shown by way of example only. In some cases, one or more of devices 2402-2411 may be absent. In other cases, one or more devices other than devices 2402-2411 may be present.

In some implementations, OOB MCU 604 may be coupled to one or more power control FETs (e.g., 705), VCI pin wake logic (e.g., 903), and/or voltage regulator (e.g., 2201) to control the availability of power to one or more of devices 2402-2411, individually, as well as that of interconnect 2401. As such, OOB MCU 604 may have the ability to wake up each device from their low power states, and to set them back into their low-power states, without waking up host processor(s) 602 from its own low power state. Furthermore, once a selected device has been woken up from its low-power state, OOB MCU 604 may send and receive packets, messages, and/or commands to that device through interconnect 2401.

Figure 25:
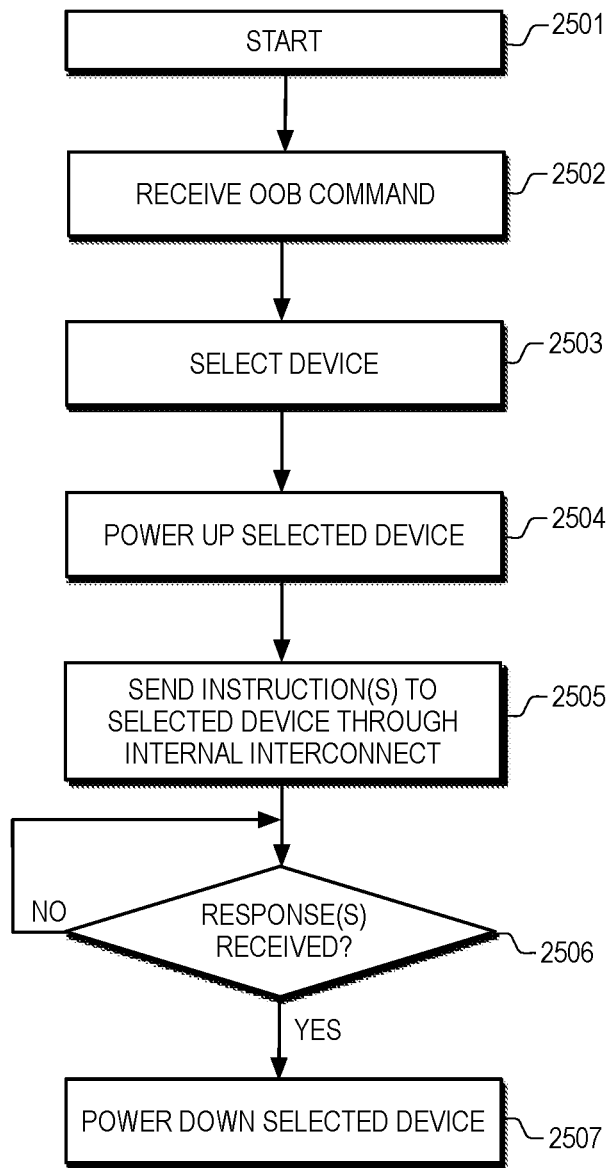
FIG. 25 is a diagram illustrating an example of a method for using an interconnect architecture to perform manageability operations, according to some embodiments.

FIG. 25 is a diagram illustrating an example of method 2500 for using interconnect architecture 2400, by OOB MCU 604, to perform manageability operations while host processor(s) 602 remains in a low-power state. Particularly, method 2500 begins at 2501.

At 2502, OOB MCU 604 receives an OOB command, for example, included in an OOB packet as a result of a G3 Sniff operation. At 2503, OOB MCU 604 identifies a selected one of devices 2401-11 to process or execute at least a portion of the OOB command.

For example, OOB MCU 604 may identify the selected device based, at least in part, upon a look up table that associates: (i) commands or types of commands; with (ii) corresponding ones of the plurality of devices or types of devices. Additionally, or alternatively, OOB MCU 604 may identify the selected device based, at least in part, upon a field within a header of the OOB packet within which the command is received (while the host processor is in the low-power state) that includes an identification of the selected device.

In some cases, the selected device may be iGPU 2402, and the command may include a request to retrieve contents of a video buffer (e.g., while host processor(s) 602 is in its low-power state). Additionally, or alternatively, the selected device may include sensor hub 2405, and the command may include a request to identify a proximity or presence state of a user of IHS 100 using a proximity sensor (e.g., while host processor(s) 602 is in its low-power state).

Additionally, or alternatively, the selected device may include audio controller 2406, and the command may include a request to retrieve an audio input using a microphone (e.g., while host processor(s) 602 is in its low-power state). Additionally, or alternatively, the selected device may include a camera controller, and the command may include a request to retrieve a video input using a camera (e.g., while host processor(s) 602 is in its low-power state).

Additionally, or alternatively, the selected device may include storage device controller 2404 (e.g., a hard drive), and the command may include a request to retrieve contents of the storage device (e.g., while host processor(s) 602 is in its low-power state). Additionally, or alternatively, the selected device may include VPU 2407 and the command may include a request to perform an AI/ML operation (e.g., while host processor(s) 602 is in its low-power state).

At 2504, OOB MCU 604 may power up the selected device out of a low-power state via one or more power control FETs, VCI pin wake logic, and/or a voltage regulator while host processor(s) 602 is in the low-power state. At 2505, OOB MCU 604 may send the command or an indication of the command to the selected device through internal interconnect 2401.

At 2506, OOB MCU 604 determines whether a response to the command or instruction has been received from the selected device via interconnect 2401 indicating that the command or instruction has been processed. If so, at 1207 OOB MCU 604 may power down the selected device to its low-power state via the one or more power control FETs, VCI pin wake logic, and/or voltage regulator.

In various embodiments, systems and methods described herein may enable OOB diagnostics in heterogeneous computing platforms. For example, OOB MCU 604 and/or EC 109 may be configured to report detailed IHS diagnostics. In the case of OOB MCU 604, OOB MCU 604 may make use of its access to SoC 601's internal fabric 2401 to initiate or perform a diagnostics check on the various SoC internal components or blocks (e.g., 2402-2411).

For IHS-level hardware devices other than SoC-integrated devices (e.g., a charger, a battery, power circuits, fans, keyboards, trackpads, mice, thermal sensors, connectors, etc.), EC 109 may initiate or perform the diagnostics check, and it may report it to through OOB MCU 604 as opaque OOB data.

Additionally, or alternatively, for IHS-level hardware devices not accessible to EC 109 (e.g., external PCIe devices connected to SoC 601), either through OOB MCU 604's access to PCIe through a bridge (e.g., high-bandwidth bus controller 613), or through UEFI/BIOS 107, making use of PCIe access to collect self-check or diagnostic data on the various PCI/USB/etc. external components to SoC 601. In the case of diagnostics performed or triggered by UEFI/BIOS 107, UEFI/BIOS 107 may be configured to trigger perform or trigger such routines after a reboot of IHS 100, prior to host OS 300 being loaded.

Figure 26:
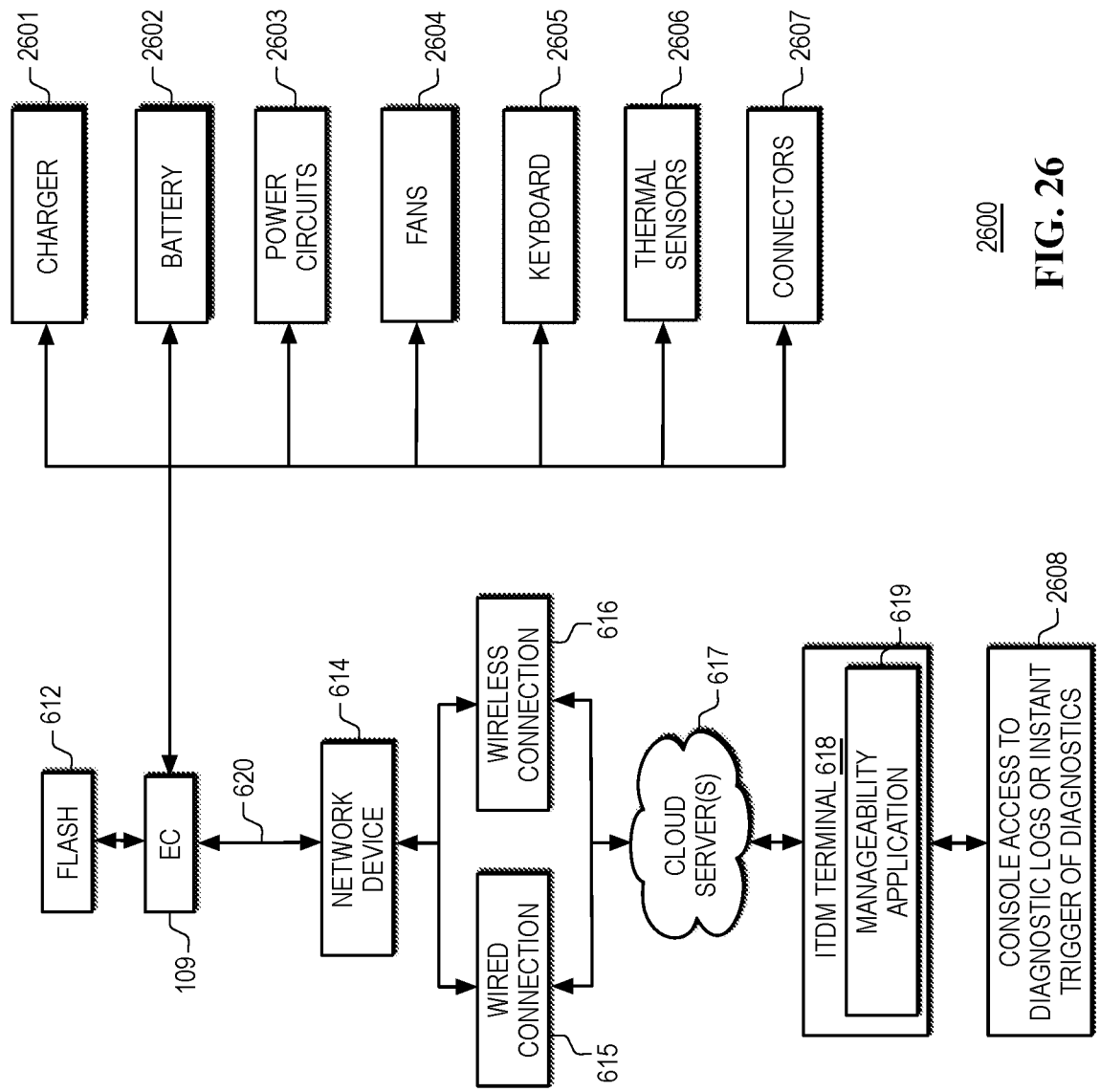
FIG. 26 is a diagram illustrating an example of a system for EC-based, OOB diagnostics, according to some embodiments.

In that regard, FIG. 26 is a diagram illustrating an example of system 2600 for EC-based, OOB diagnostics. In some embodiments, EC 109 may be coupled to IHS-level hardware devices other than SoC-integrated devices such as, for example, charger 2601, battery 2602, power circuits 2603 (e.g., VRs, PMICs, PSUs, etc.), fans 2604, keyboard 2605, thermal sensors 2606, and connectors 2607, among others. In various implementations, EC 109 may include firmware that, upon execution, performs diagnostic testing of devices 2601-2607 and produces a diagnostics report.

Still referring to system 2600, OOB MCU 604's and/or EC 109's diagnostics report may indicate detected hardware failures associated with devices 2402-2411 and/or 2601-2607, respectively. In some implementations, OOB MCU 604 and/or EC 109 may transmit the diagnostics report to manageability terminal 618, which provides, to an ITDM, console access 2608 to diagnostic logs and/or it enables the ITDM to trigger the performance of diagnostics operations by OOB MCU 604 and/or EC 109.

In some cases, OOB MCU 604 and/or EC 109 may transmit the diagnostics report to manageability terminal 618 through cloud service(s) 617 as part of an OOB packet sniffing operation, for example, as one or more opaque OOB packets.

Figure 27:
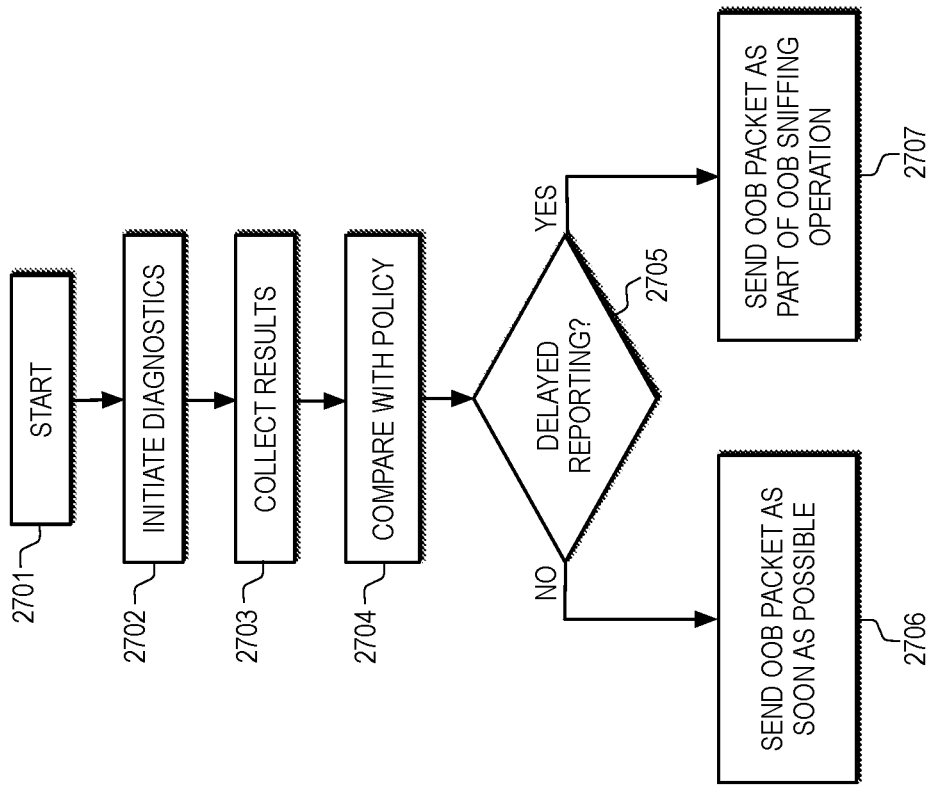
FIG. 27 is a diagram illustrating an example of a method for performing OOB diagnostics, according to some embodiments.

FIG. 27 is a diagram illustrating an example of method 2700 for performing OOB diagnostics, according to some embodiments. In various embodiments, method 2700 may be performed, at least in part, by OOB MCU 604 and/or EC 109.

Particularly, method 2700 starts at 2701. At 2702, OOB MCU 604 and/or EC 109 may initiate, request, or trigger the performance of diagnostics routine(s) by one or more of their respective devices. In some cases, such as when IHS 100 and/or SoC 601 are in a low-power mode, OOB MCU 604 and/or EC 109 may temporarily wake up one or more of their respective devices (e.g., using GPIO signal, etc.) to perform the diagnostics routine(s) while host processor(s) 602 remain in the low-power state.

At 2703, OOB MCU 604 and/or EC 109 may receive or collect the results of the diagnostics routine(s), and/or it may produce a diagnostics report based upon the results. For example, a diagnostics report may indicate a hardware failure associated with devices 2402-2411 integrated into SoC 601 and coupled to OOB MCU 604 via interconnect 2401. Additionally, or alternatively, the diagnostics report may include a hardware failure associated with devices 2601-2607 coupled to EC 109.

At 2704, OOB MCU 604 and/or EC 109 may compare the diagnostic results and/or attributes thereof (e.g., time of detection, gravity of failure, etc.) against an OOB diagnostics policy (e.g., as outlined in a JavaScript Object Notation or "JSON" or Extensible Markup Language or "XML" file). At 2705, OOB MCU 604 and/or EC 109 may determine whether the OOB diagnostics policy specifies, for failures, types of failures, and/or attributes thereof, whether a detected hardware failure is subject to immediate OOB alerting or amenable to delayed OOB alerting.

At 2706, if failure(s) indicated in the diagnostic results or report is/are not subject to delayed reporting (e.g., the failure(s) is/are considered to be critical to the proper operation of IHS 100), OOB MCU 604 and/or EC 109 may send an indication of the diagnostic results or report as soon as possible to ITDM terminal 618 via cloud server(s) 617, often immediately.

Conversely, if the detected failure(s) indicated in the diagnostic results or report is/are subject to delayed reporting (e.g., the failure(s) is/are considered non-critical), OOB MCU 604 and/or EC 109 may send an indication of the diagnostic results or report to ITDM terminal 618 as part of any subsequent OOB packet sniffing operation (e.g., 1102A), or in connection with the next OOB packet sniffing operation that retrieves OOB packets and therefore establishes an OOB connection with cloud server(s) 617 (e.g., 1102B), as also specified in the OOB diagnostics policy.

In some implementations, to transmit the indication of the result as part of the OOB sniffing operation, OOB MCU 604 and/or EC 109 may be configured to wake up while host processor(s) 602 are in a low-power state, and to wake up network device 614 configured to access cloud server(s) 617 while host processor(s) 602 remain in the low-power state.

Figure 28:
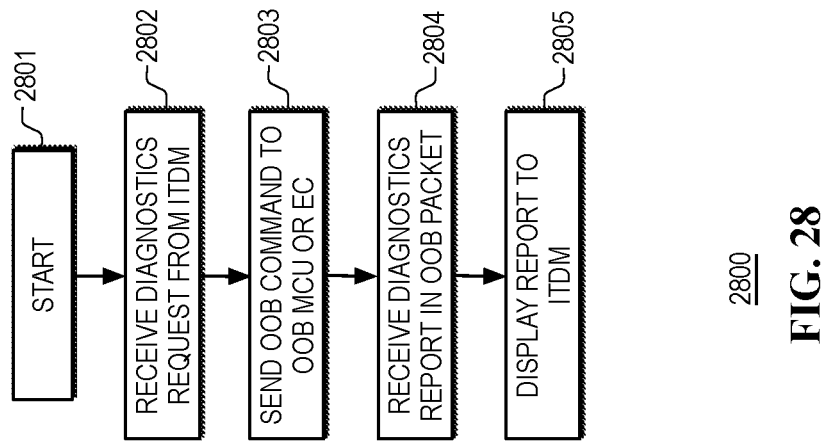
FIG. 28 is a diagram illustrating an example of a method for processing ITDM requests of OOB diagnostics, according to some embodiments.

FIG. 28 is a diagram illustrating an example of method 2800 for processing ITDM requests of OOB diagnostics. In various embodiments, method 2800 may be performed, at least in part, by cloud server(s) 617 and/or ITDM terminal 618 in cooperation with OOB MCU 604 and/or EC 109 of IHS 100.

Specifically, method 2800 starts at 2801. At 2802, ITDM terminal 618 may receive a diagnostics request or instruction from an ITDM for IHS 100 or a group of IHSs. Additionally, or alternatively, ITDM terminal 618 may automatically (e.g., periodically) produce diagnostics requests or instructions based upon an OOB diagnostics reporting policy, or the like.

At 2803, cloud server(s) 617 may send an OOB command indicating the diagnostics request or instruction to OOB MCU 604 and/or EC 109. For example, the OOB command may be included in an opaque OOB packet.

In some cases, the diagnostics request or instruction may be sent to OOB MCU 604 and/or EC 109 immediately, such as when IHS 100 is in an S0 state. In other cases, the diagnostics request or instruction may be stored in a command buffer associated with the particular IHS or groups of IHSs, and retrieved by OOB MCU 604 and/or EC 109 at a later time as part of IHS 100's OOB packet sniffing operation (e.g., as an opaque OOB packet).

At 2804, ITDM terminal 618 may receive, over an OOB network connection, an indication of a hardware failure or a diagnostics report from OOB MCU 604 and/or EC 109. At 2805, ITDM terminal 618 may display the indication or report on Graphical User Interface (GUI) or the like. Additionally, or alternatively, the indication or report may be logged in a diagnostics database (e.g., for later analysis).

In some cases, in response to having received an indication of a hardware failure, ITDM terminal 618 may automatically dispatch a replacement part to the user or IHS 100. For example, if the hardware failure involves a device within SoC 601, ITDM terminal 618 may place an order for another SoC module or motherboard.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a heterogeneous computing platform comprising a plurality of devices, wherein the heterogeneous computing platform comprises: a System-On-Chip (SoC), a Field-Programmable Gate Array (FPGA), or an Application-Specific Integrated Circuit (ASIC); and
an Out-of-Band (OOB) Microcontroller Unit (MCU) integrated into the heterogeneous computing platform and coupled to the plurality of devices via an interconnect, wherein the OOB MCU is configured to:
receive a result of a diagnostics operation performed with respect to at least a given one of the plurality of devices; and
transmit an indication of the result, as part of an OOB sniffing operation, to a remote IHS.

2. The IHS of claim 1, wherein the heterogeneous computing platform comprises a Reduced Instruction Set Computer (RISC) host processor.

3. The IHS of claim 1, wherein the plurality of devices comprises at least one of: a Graphical Processing Unit (GPU), an audio Digital Signal Processor (aDSP), a sensor hub, a Neural Processing Unit (NPU), a Tensor Processing Unit (TPU), a Neural Network Processor (NNP), an Intelligence Processing Unit (IPU), an Image Signal Processor (ISP), or a Video Processing Unit (VPU).

4. The IHS of claim 1, wherein the interconnect comprises at least one of: an Advanced Microcontroller Bus Architecture (AMBA) bus, a QuickPath Interconnect (QPI) bus, or a HyperTransport (HT) bus.

5. The IHS of claim 1, wherein the result comprises a hardware failure associated with the given device.

6. The IHS of claim 1, wherein the OOB MCU is further configured to perform the diagnostics operation upon the given device.

7. The IHS of claim 1, wherein the OOB MCU is further configured to, prior to receipt of the result, send a message or signal to the given device to request that the diagnostics operation be performed.

8. The IHS of claim 1, wherein to transmit the indication of the result as part of the OOB sniffing operation, the OOB MCU is configured to determine, based at least in part upon an OOB diagnostics policy, that the result is subject to delayed reporting.

9. The IHS of claim 8, wherein to transmit the indication of the result as part of the OOB sniffing operation, the OOB MCU is configured to:
wake up while a host processor of the heterogeneous computing platform is in a low-power state; and
wake up a network device configured to access the remote IHS while the host processor remains in the low-power state.

10. The IHS of claim 9, wherein the low-power state comprises an Advanced Configuration and Power Interface (ACPI) G3 state.

11. An Embedded Controller (EC) coupled to a heterogeneous computing platform of an Information Handling System (IHS), the EC comprising:
- a processing core; and
- a memory coupled to the processing core, the memory having program instructions stored thereon that, upon execution by the processing core, cause the EC to:
  - receive a result of a diagnostics operation performed with respect to a device coupled to the EC, wherein the result comprises a hardware failure; and
  - transmit an indication of the result, as part of an OOB sniffing operation, to a remote IHS.

12. The EC of claim 11, wherein the device is selected from a group consisting of: a charger, a battery, a power circuit, a fan, a keyboard, a thermal sensor, and a connector.

13. The EC of claim 11, wherein to transmit the indication of the result as part of the OOB sniffing operation, the program instructions, upon execution by the processing core, cause the EC to determine, based at least in part upon an OOB diagnostics policy, that the result is subject to delayed reporting.

14. The EC of claim 12, wherein to transmit the indication of an event as part of the OOB sniffing operation, the EC is configured to:
- wake up while a host processor of the heterogeneous computing platform is in a low-power state; and
- wake up a network device configured to access the remote IHS while the host processor remains in the low-power state.

15. A method, comprising:
- sending a request to an Out-of-Band (OOB) Microcontroller Unit (MCU) integrated into a heterogeneous computing platform or an Embedded Controller (EC) coupled to the heterogeneous computing platform of an Information Handling System (IHS) to: (i) perform a diagnostics operation with respect to a selected device coupled to the OOB MCU or EC, or (ii) request that the selected device perform the diagnostics operation;
- receiving, from the IHS as part of an OOB sniffing operation, an indication of a diagnostics operation collected by the OOB MCU or EC; and
- determining whether to: (a) display the indication to an Information Technology Decision Maker (ITDM), or (b) log the indication.

16. The method of claim 15, wherein the indication is contained in an opaque OOB packet transmitted by the IHS.

* * * * *